US012237591B2

(12) United States Patent
Hong et al.

(10) Patent No.: US 12,237,591 B2
(45) Date of Patent: Feb. 25, 2025

(54) ANTENNA ASSEMBLY AND INTERACTIVE WHITE BOARD

(71) Applicant: GUANGZHOU SHIYUAN ELECTRONIC TECHNOLOGY COMPANY LIMITED, Guangzhou (CN)

(72) Inventors: Guofeng Hong, Guangzhou (CN); Bingjie Deng, Guangzhou (CN)

(73) Assignee: GUANGZHOU SHIYUAN ELECTRONIC TECHNOLOGY COMPANY LIMITED, Guangzhou (CN)

(*) Notice: Subject to any disclaimer, the term of this patent is extended or adjusted under 35 U.S.C. 154(b) by 205 days.

(21) Appl. No.: 17/988,718

(22) Filed: Nov. 16, 2022

(65) Prior Publication Data

US 2023/0268653 A1 Aug. 24, 2023

Related U.S. Application Data

(63) Continuation of application No. PCT/CN2022/076904, filed on Feb. 18, 2022.

(51) Int. Cl.
*H01Q 9/04* (2006.01)
*H01Q 1/22* (2006.01)
(Continued)

(52) U.S. Cl.
CPC .......... *H01Q 9/045* (2013.01); *H01Q 1/2266* (2013.01); *H01Q 1/2291* (2013.01); *H01Q 1/48* (2013.01);
(Continued)

(58) Field of Classification Search
CPC .... H01Q 9/045; H01Q 1/2266; H01Q 1/2291; H01Q 1/48; H01Q 1/521; H01Q 21/0037;
(Continued)

(56) References Cited

U.S. PATENT DOCUMENTS 4,087,822 A * 5/1978 Maybell ................ H01Q 21/08 343/778
4,291,312 A * 9/1981 Kaloi .................. H01Q 21/065 343/700 MS (Continued)

FOREIGN PATENT DOCUMENTS

CN 103219592 A * 7/2013 ............ H01Q 1/243
CN 112164882 A * 1/2021

(Continued)

*Primary Examiner* — Hai V Tran
*Assistant Examiner* — Jordan E. DeWitt
(74) *Attorney, Agent, or Firm* — BAYES PLLC

(57) ABSTRACT

An antenna assembly includes a dielectric substrate, wherein a first surface of the dielectric substrate includes a ground plane and a closed clearance region located in the ground plane; a first antenna unit and a second antenna unit, the first antenna unit and the second antenna unit being spaced apart on the first surface of the dielectric substrate and located in the closed clearance region, and the first antenna unit and the second antenna unit being orthogonally arranged; a radio frequency chip, arranged on the dielectric substrate and connected with the first antenna unit and the second antenna unit respectively; and a metal resonant cavity, arranged on a second surface of the dielectric substrate, wherein in a direction perpendicular to the second surface, at least a part of a projection of the closed clearance region on the metal resonant cavity is within an outer contour of the metal resonant cavity.

16 Claims, 17 Drawing Sheets

(51) Int. Cl.
*H01Q 1/48* (2006.01)
*H01Q 1/52* (2006.01)
*H01Q 21/00* (2006.01)

(52) U.S. Cl.
CPC ......... *H01Q 1/521* (2013.01); *H01Q 21/0037* (2013.01)

(58) Field of Classification Search
CPC .. H01Q 1/44; H01Q 7/00; H01Q 9/30; H01Q 15/166; H01Q 21/30; H01Q 1/38; H01Q 1/243; H01Q 21/205
See application file for complete search history.

(56) References Cited

U.S. PATENT DOCUMENTS

| | | | | | |
|---|---|---|---|---|---|
| 4,873,529 | A * | 10/1989 | Gibson | H01Q 9/0435 | 343/769 |
| 4,893,126 | A * | 1/1990 | Evans | H01Q 1/247 | 342/175 |
| 5,061,943 | A * | 10/1991 | Rammos | H01Q 21/0075 | 343/789 |
| 5,124,713 | A * | 6/1992 | Mayes | H01Q 9/0435 | 343/846 |
| 5,408,241 | A * | 4/1995 | Shattuck, Jr. | H01Q 9/0414 | 343/846 |
| 5,793,263 | A * | 8/1998 | Pozar | H01P 5/107 | 333/33 |
| 5,872,545 | A * | 2/1999 | Rammos | H01Q 21/24 | 343/770 |
| 5,903,820 | A * | 5/1999 | Hagstrom | H04B 1/40 | 455/84 |
| 6,133,880 | A * | 10/2000 | Grangeat | H01P 5/08 | 343/700 MS |
| 6,611,235 | B2 * | 8/2003 | Barna | H01Q 5/371 | 343/702 |
| 6,717,550 | B1 * | 4/2004 | Aisenbrey | H01Q 9/0421 | 343/846 |
| 7,256,743 | B2 * | 8/2007 | Korva | H01Q 5/378 | 343/702 |
| 7,994,999 | B2 * | 8/2011 | Maeda | H01Q 9/0407 | 343/769 |
| 9,406,998 | B2 * | 8/2016 | Korva | H01Q 21/30 | |
| 10,090,584 | B2 * | 10/2018 | Duan | H01Q 9/40 | |
| 10,389,034 | B2 * | 8/2019 | Dumanli Oktar | H01Q 13/106 | |
| 11,121,472 | B2 * | 9/2021 | Zhao | H01Q 13/106 | |
| 2003/0038751 | A1 * | 2/2003 | Iwai | H01Q 1/243 | 343/702 |
| 2004/0145521 | A1 * | 7/2004 | Hebron | H01Q 21/30 | 343/702 |
| 2004/0183731 | A1 * | 9/2004 | Darden | H01Q 1/22 | 343/702 |
| 2005/0219128 | A1 * | 10/2005 | Tan | H01Q 9/0442 | 343/702 |
| 2006/0001572 | A1 * | 1/2006 | Gaucher | H01Q 9/26 | 343/700 MS |
| 2007/0152885 | A1 * | 7/2007 | Sorvala | H01Q 1/38 | 343/702 |
| 2008/0143606 | A1 * | 6/2008 | Ng | H01Q 9/0407 | 343/700 MS |
| 2009/0073074 | A1 * | 3/2009 | Chang | H01Q 9/0428 | 343/846 |
| 2009/0135077 | A1 * | 5/2009 | Kim | H01Q 7/00 | 343/831 |
| 2011/0001682 | A1 * | 1/2011 | Rao | H01Q 9/0414 | 343/893 |
| 2013/0002503 | A1 * | 1/2013 | Tan | H01Q 9/26 | 343/893 |
| 2013/0214986 | A1 * | 8/2013 | Zhu | H01Q 1/243 | 343/866 |
| 2015/0035713 | A1 * | 2/2015 | Goto | H01Q 5/50 | 343/749 |
| 2015/0042520 | A1 * | 2/2015 | Zhao | H01Q 9/0421 | 343/702 |
| 2016/0276742 | A1 * | 9/2016 | Yu | H01Q 1/48 | |
| 2017/0331191 | A1 * | 11/2017 | Komachi | H01Q 7/005 | |
| 2017/0331193 | A1 * | 11/2017 | Xue | H01Q 9/0428 | |
| 2018/0061681 | A1 * | 3/2018 | Koshimizu | H01L 21/67103 | |
| 2018/0069307 | A1 * | 3/2018 | Lu | H01Q 1/523 | |
| 2019/0006745 | A1 * | 1/2019 | Suematsu | G01S 7/032 | |
| 2019/0081386 | A1 * | 3/2019 | Edwards | H01Q 5/328 | |
| 2019/0267718 | A1 * | 8/2019 | Rajagopalan | H01Q 1/523 | |
| 2020/0373966 | A1 * | 11/2020 | Sarabandi | H01P 3/10 | |
| 2021/0028556 | A1 * | 1/2021 | Brar | H01Q 21/062 | |
| 2021/0066786 | A1 * | 3/2021 | Yarga | H01Q 1/243 | |
| 2021/0075090 | A1 * | 3/2021 | Yarga | H01Q 1/241 | |
| 2021/0351503 | A1 * | 11/2021 | Miyagawa | H01Q 1/526 | |
| 2022/0158352 | A1 * | 5/2022 | K | H01Q 9/40 | |
| 2022/0320724 | A1 * | 10/2022 | Deng | H01Q 1/523 | |
| 2023/0091189 | A1 * | 3/2023 | Deng | H01Q 1/2266 | |
| 2023/0155302 | A1 * | 5/2023 | Yu | H01Q 21/205 | 343/700 MS |
| 2023/0268653 | A1 * | 8/2023 | Hong | H01Q 9/045 | 343/702 |
| 2024/0178557 | A1 * | 5/2024 | Sukegawa | H01Q 21/065 | |

FOREIGN PATENT DOCUMENTS

| | | | | |
|---|---|---|---|---|
| CN | 112306299 A * | 2/2021 | G06F 3/0412 |
| WO | WO-2017114063 A1 * | 7/2017 | H01Q 1/38 |
| WO | WO-2023203069 A1 * | 10/2023 | H01Q 1/2291 |

* cited by examiner b a

ANTENNA ASSEMBLY AND INTERACTIVE WHITE BOARD

CROSS-REFERENCE TO RELATED APPLICATIONS

The present application is a continuation of International Application No. PCT/CN2022/076904, filed on Feb. 18, 2022. The entire content of the above-identified application is expressly incorporated herein by reference.

TECHNICAL FIELD

The present disclosure relates to the technical field of antennas, and in particular to an antenna assembly and an interactive white board.

BACKGROUND

With progress of wireless communication technology, a wireless communication technology has been applied in an interactive white board, and the wireless data transmission function in the interactive white board needs the support of antennas.

In the interactive white board, wireless access point function and connection to a screen transmitter are realized through an antenna. A user of the wireless access point function and the screen transmitter are usually in front of the interactive white board. The users in front of the interactive white board can access a network through the wireless access point function of the interactive white board, and the data on PC can be transmitted to the interactive white board through the screen transmitter for display.

At present, the antenna in the interactive white board is omnidirectional radiation, and a forward radiation performance of the antenna is poor. In order to improve the forward radiation performance, a complex antenna is arranged, resulting in an increase in the volume of the entire antenna.

SUMMARY

The purpose of embodiments of the present disclosure is to provide an antenna assembly and an interactive white board in order to solve problems of omnidirectional radiation, poor forward radiation performance and large volume of the antenna in the interactive white board.

In order to achieve this purpose, the embodiments of the present disclosure adopt the following technical scheme:

A first aspect provides an antenna assembly, includes a dielectric substrate, of which a first surface is provided with a ground plane and a closed clearance region located in the ground plane; a first antenna unit and a second antenna unit, the first antenna unit and the second antenna unit being spaced apart on the first surface of the dielectric substrate and located in the clearance region, and the first antenna unit and the second antenna unit being orthogonally arranged; a radio frequency chip, arranged on the dielectric substrate and connected with the first antenna unit and the second antenna unit respectively; and a metal resonant cavity arranged on a second surface of the dielectric substrate, wherein in a direction perpendicular to the second surface, at least a part of a projection of the clearance region on the metal resonant cavity is within an outer contour of the metal resonant cavity.

In a second aspect, embodiments of the present disclosure provide an interactive white board. The interactive white board comprises a display screen, a frame arranged around the display screen, and an antenna assembly according to the first aspect, wherein the antenna assembly is located in the interactive white board and connected with the frame, and a surface, which is not provided with the metal resonant cavity, of the dielectric substrate in the antenna assembly faces the frame.

In the antenna assembly according to embodiments of the present disclosure, the first surface of the dielectric substrate is provided with the ground plane and the closed clearance region located in the ground plane, the first antenna unit and the second antenna unit are spaced apart on the first surface of the dielectric substrate and located in the clearance region. The radio frequency chip is arranged on the dielectric substrate, and connected with the first antenna unit and the second antenna unit respectively. The metal resonant cavity is arranged on the second surface of the dielectric substrate. In the direction perpendicular to the second surface, at least a part of the projection of the clearance region on the metal resonant cavity is within an outer contour of the metal resonant cavity. When the antenna assembly is installed on the interactive white board, the antenna assembly can be located in the interactive white board and connected with the frame, and the first surface, which is not provided with the metal resonant cavity, of the dielectric substrate in the antenna assembly faces the frame, so that the electromagnetic wave radiated from the antenna unit in the clearance region to the inside of the metal resonant cavity is reflected by the metal resonant cavity, and the reflected electromagnetic wave is radiated toward the direction of the first surface, thereby realizing that the antenna assembly radiates the electromagnetic wave to the side, which is provided with the first surface, of the dielectric substrate, and enhancing an intensity of the electromagnetic wave radiated from the side provided with the first surface. Moreover, the first antenna unit and the second antenna unit are arranged orthogonally, the isolation between the first antenna unit and the second antenna unit is high, and the first antenna unit and the second antenna unit does not interfere with each other, thereby improving the radiation performance of the entire antenna assembly. In addition, the antenna unit is arranged in a closed clearance region, and thus wiring of the antenna unit can be simplified to reduce an area of the dielectric substrate, so that the antenna assembly can be made smaller.

BRIEF DESCRIPTION OF DRAWINGS

The present disclosure will be further described in detail according to the drawings and embodiments.

In the figures,

1. Dielectric substrate; 11. Ground plane; 12. Clearance region; 121. First clearance region; 1211. First boundary; 1212. Second boundary; 122. Second clearance region; 1221. Third boundary; 1222. Fourth boundary; 13. Grounded stubs for increased isolation; 14. First coplanar waveguide transmission line; 15. Second coplanar waveguide transmission line; 16. Third coplanar waveguide transmission line; 17. Fourth coplanar waveguide transmission line; 2. Antenna unit; 21. First antenna unit; 211. First feeder stub; 212. First ground stub; 2121. First ground sub-stub; 2122. Second ground sub-stub; 2123. Third ground sub-stub; 2124. Fourth ground sub-stub; 213. Third ground stub; 22. Second antenna unit; 221. Second feeder stub; 222. Second ground stub; 2221. Fifth ground sub-stub; 2222. Sixth ground sub-stub; 2223. Seventh ground sub-stub; 2124. Eighth ground sub-stub; 223. Fourth ground stub; 23. Third antenna unit; 24. Fourth antenna unit; 3. Metal resonant cavity; 4. Radio frequency chip; 41. First radio frequency chip; 42. Second radio frequency chip; 100. Interactive white board; 101. Display screen; 102. Frame; 1021. Lower frame; 10211. Avoidance hole; 10212. Bottom surface; 10213. Side surface; 103. Antenna assembly; 104. Decorative piece.

DETAILED DESCRIPTION

In order to make the technical problems to be solved, the technical solutions to be adopted and the technical effects to be achieved by the present disclosure clearer, the technical solutions of embodiments of the present disclosure will be further described in detail hereinafter in combination with the accompanying drawings. The described embodiments are only a part of embodiments of the present disclosure, not all of embodiments of the present disclosure. Based on the embodiments of the present disclosure, all other embodiments obtained by those skilled in the art without creative work belong to the claimed scope of the present disclosure.

In the description of the present disclosure, unless otherwise specified and limited, the terms "connected with/to," "connected," and "fixed" should be interpreted broadly. For example, they can be fixedly connected, detachably connected, or integrated. It can be a mechanical connection or an electrical connection. And they can be directly connected or indirectly connected through an intermediate medium, or, they can be the connection between two components or the interaction relationship between two components.

Figure 1:
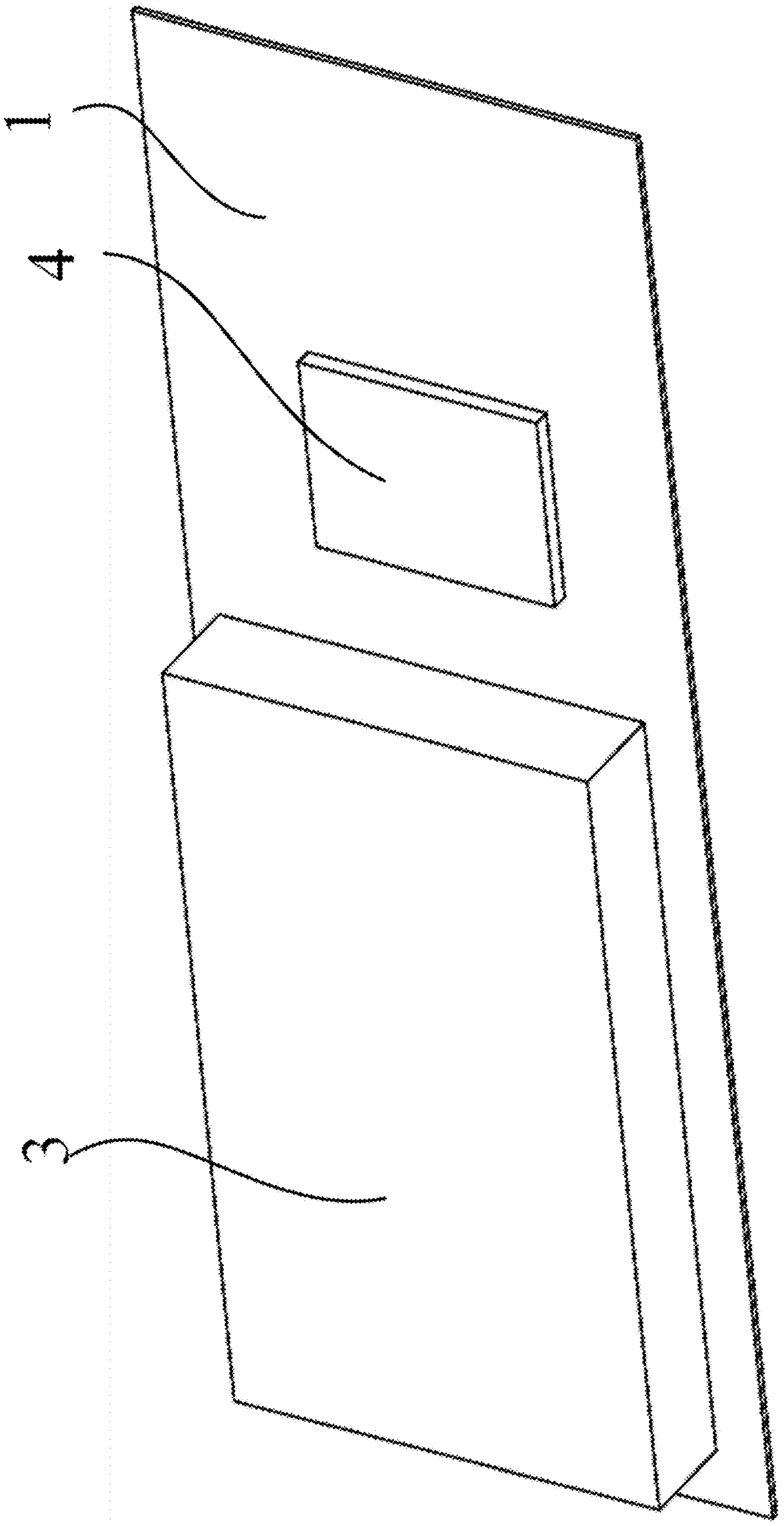
FIG. 1 is a schematic diagram of an overall structure of an antenna assembly according to an embodiment of the present disclosure.
Figure 2:
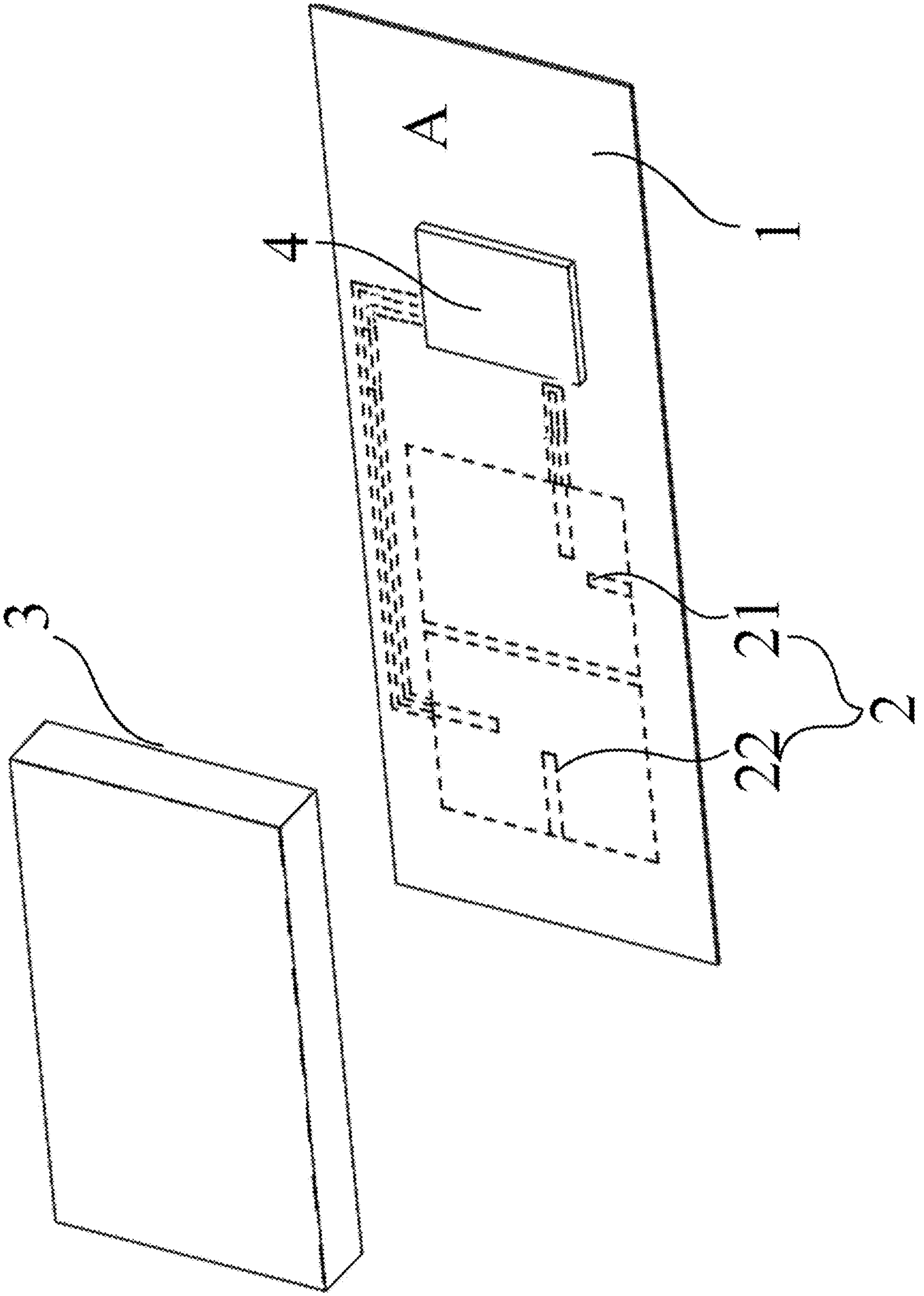
FIG. 2 is a schematic diagram of an exploded structure of an antenna assembly according to the embodiment of the present disclosure.

In the present disclosure, unless expressly stipulated and defined otherwise, a first feature being "above" or "below" a second feature may comprise that the first feature directly contacts with the second feature, or may comprise that the first feature does not directly contact with the second feature, rather than contact through another feature therebetween. Moreover, the first feature being "above," "over," and "on" the second feature may comprise that the first feature is directly above and obliquely above the second feature, or simply means that the level of the first feature is higher than that of the second feature. The first feature being "below," "under," and "underneath" the second feature comprises that the first feature is directly below and obliquely below the second feature, or simply means that the level of the first feature is smaller than that of the second feature. As shown in FIGS. 1 and 2, an antenna assembly according to an embodiment of the present disclosure includes a dielectric substrate 1, an antenna unit 2, a radio frequency chip 4, and a metal resonant cavity 3.

Therein, the dielectric substrate 1 may be a PCB board of the antenna assembly, the antenna unit 2 may be a unit that radiates electromagnetic waves, and the antenna unit 2 may be a metal sheet with a preset shape printed on the surface of the dielectric substrate 1, for example, a copper sheet with various shapes printed on the surface of the dielectric substrate 1. Therein, the antenna unit 2 includes a first antenna unit 21 and a second antenna unit 22. The first antenna unit 21 and the second antenna unit 22 can be electrically connected with the radio frequency chip 4 via a transmission line, for example, the first antenna unit 21 and the second antenna unit 22 can be electrically connected with the radio frequency chip 4 through a transmission line printed on the dielectric substrate 1.

The metal resonant cavity 3 may be a cover made of metal materials such as stainless steel, galvanized steel plate, etc. The metal resonant cavity 3 is provided with an opening. Specifically, the metal resonant cavity 3 may be a cover structure. The cover structure includes a bottom surface and a side surface connected with the bottom surface. The bottom surface and the side surfaces form a cover with an opening, preferably, a rectangular metal resonant cavity, which facilitates manufacturing the metal resonant cavity.

Figure 4:
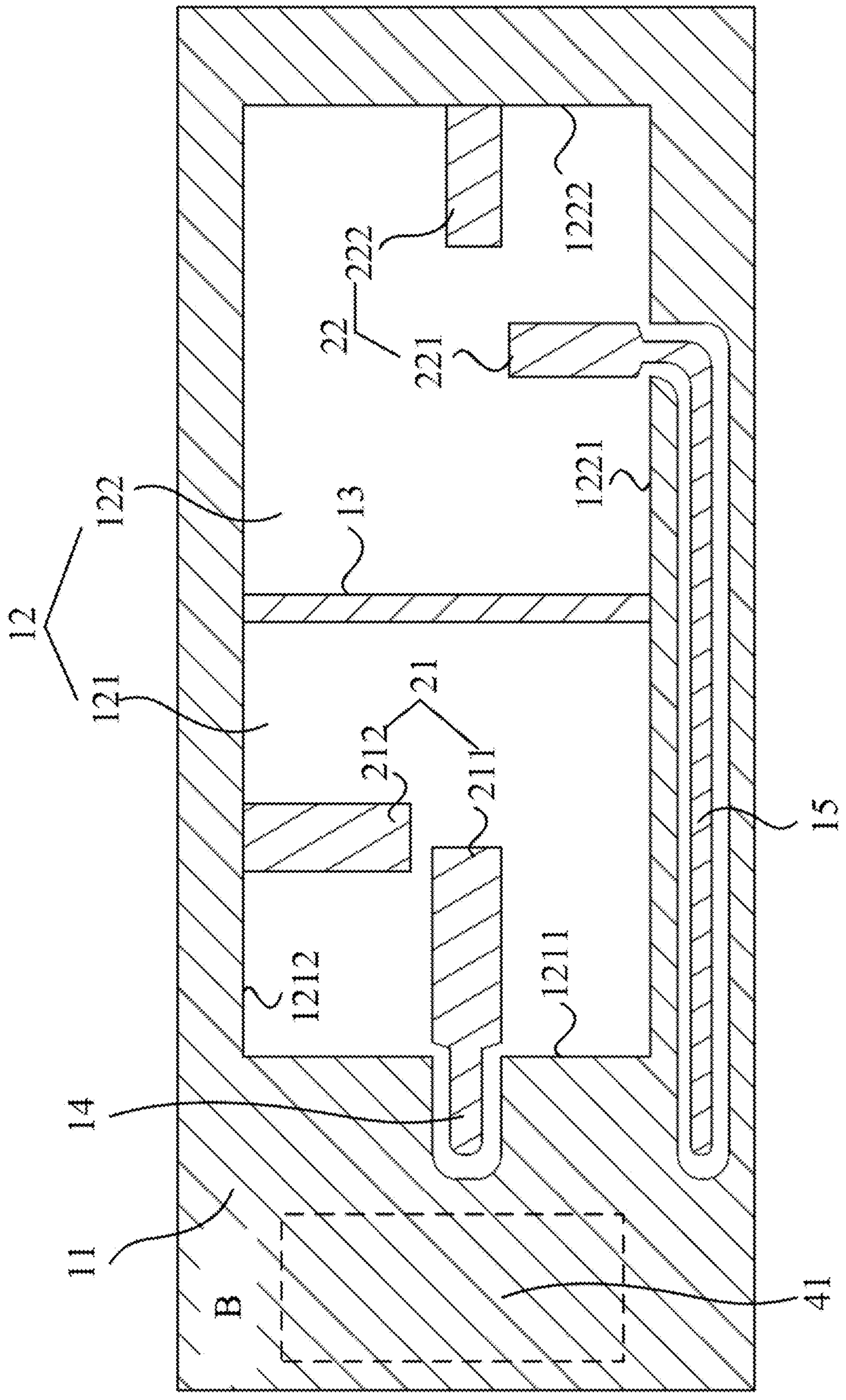
FIG. 4 is a schematic diagram of a structure of an antenna unit according to the embodiment of the present disclosure.

As shown in FIGS. 2 and 4, a surface B in FIG. 4 is a first surface of the dielectric substrate 1. The first surface B may be provided with a ground plane 11 and a closed clearance region 12 located in the ground plane 11. Therein, the clearance region 12 may be a region in the ground plane 11 where ground plane has been partially removed, and the clearance region 12 may be a closed clearance region. The first antenna unit 21 and the second antenna unit 22 are spaced apart in the clearance region, which can improve a radiation efficiency of the antenna unit, and can be simplified to reduce an area of the antenna unit occupying the dielectric substrate 1, so that the entire antenna assembly can be made smaller. In addition, the first antenna unit 21 and the second antenna unit 22 are orthogonal. The first antenna unit 21 and the second antenna unit 22 being orthogonal means that a phase difference between a phase of the electromagnetic wave radiated by the first antenna unit 21 and a phase of the electromagnetic wave radiated by the second antenna unit 22 is 90°, so as to improve an isolation between the first antenna unit 21 and the second antenna unit 22 and improve the radiation performance of the antenna assembly.

A surface A in FIG. 2 is a second surface A of the dielectric substrate 1, and the second surface A is provided with the metal resonant cavity 3. In a direction perpendicular to the second surface A, at least a part of a projection of the clearance region 12 on the metal resonant cavity 3 is within an outer contour of the metal resonant cavity 3. It should be noted that the first surface B and the second surface A of the dielectric substrate 1 are two surfaces of the dielectric substrate 1 used for arranging electrical components, that is, they are two surfaces on different sides of a main body of the dielectric substrate 1.

Figure 3:
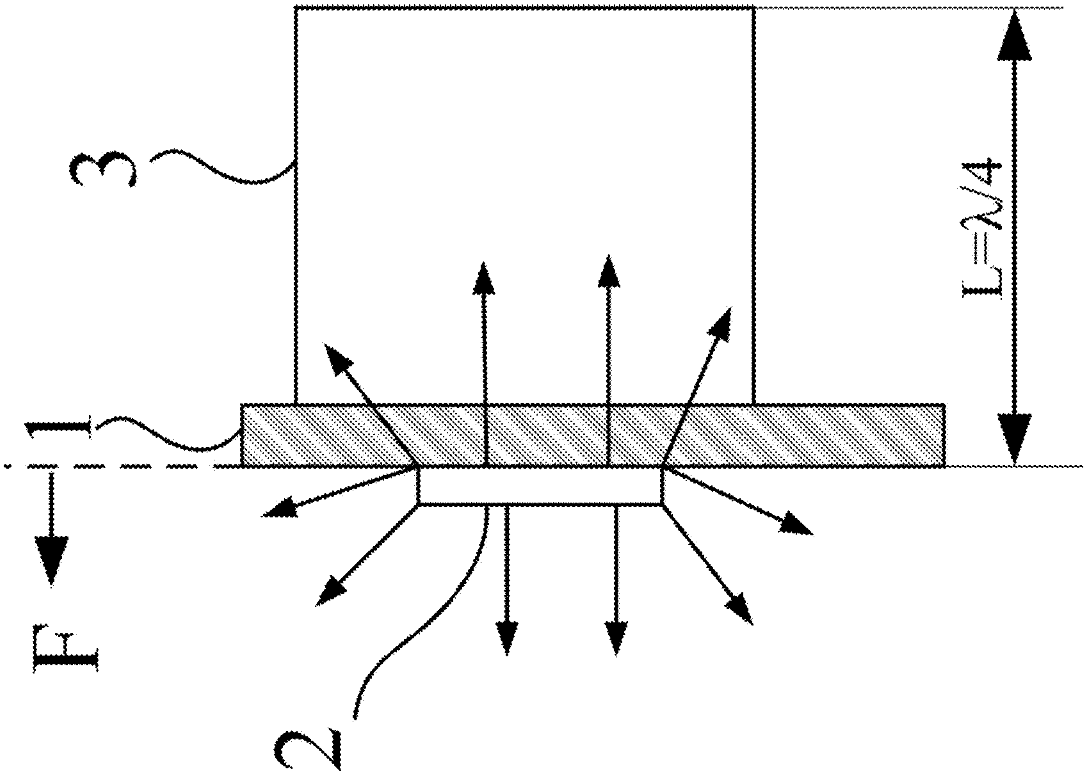
FIG. 3 is a schematic diagram of a direction of electromagnetic waves radiated by the antenna assembly in the embodiment of the present disclosure.

As shown in FIG. 3, in the embodiment of the present disclosure, the first antenna unit 21 and the second antenna unit 22 can radiate electromagnetic waves in all directions. The entire antenna assembly is finally required that a side (side F in FIG. 3), which is provided with the first antenna unit 21 and the second antenna unit 22, of the dielectric substrate 1 radiates electromagnetic waves (directions of multiple arrow on side F in FIG. 3 are radiation directions). As shown in FIG. 3, the metal resonant cavity 3 may be arranged on a surface of the dielectric substrate 1 facing away from the first antenna unit 21 and the second antenna unit 22. Moreover, since at least a part of the projection of the clearance region 12 on the metal resonant cavity 3 is within the outer contour of the metal resonant cavity 3, at least a part of the electromagnetic waves radiated by the first antenna unit 21 and the second antenna unit 22 arranged in the clearance region 12 toward the metal resonant cavity 3 are reflected by an inner wall of the metal resonant cavity 3. The reflected electromagnetic wave is radiated to a side (side F in FIG. 3), which is provided with the first antenna unit 21 and the second antenna unit 22, of the dielectric substrate 1. On the one hand, the entire antenna assembly radiates electromagnetic waves only at the side F, and a directivity of the electromagnetic waves radiated by the antenna assembly is good. On the other hand, the electromagnetic waves radiated by the first antenna unit 21 and the second antenna unit 22 toward the metal resonant cavity 3 are reflected and then superimposed on electromagnetic waves radiated toward the side F, thereby enhancing the intensity of the electromagnetic wave radiated toward the side F. On the other hand, the metal resonant cavity 3 can also prevent the external electromagnetic wave from causing electromagnetic interference to the antenna unit 2, which improves an anti-electromagnetic interference performance of the antenna assembly.

In some embodiments, the projection of the clearance region 12 on the metal resonant cavity 3 is within the outer contour of the metal resonant cavity 3, so that all electromagnetic waves radiated by sides of the first antenna unit 21 and the second antenna unit 22 disposed in the clearance region 12 toward the metal resonant cavity 3 are reflected by an inner wall of the metal resonant cavity 3, which enhances the intensity of electromagnetic waves radiated toward the side F.

Figure 5:
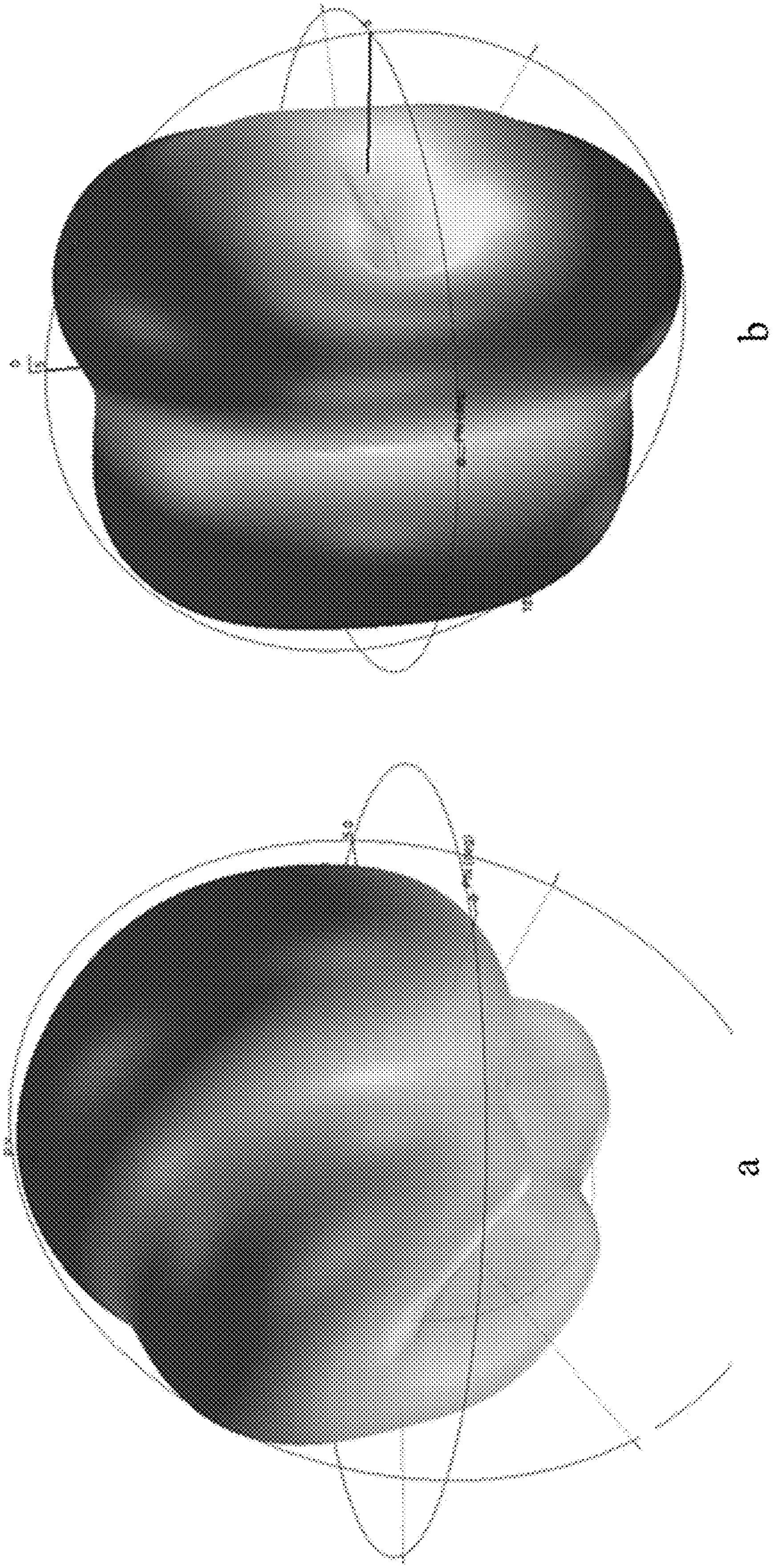
FIG. 5 illustrates 3D schematic diagrams of radiation gain of the antenna assembly before and after the metal resonant cavity is added according to the embodiment of the present disclosure.

FIG. 5 illustrates 3D schematic diagrams of antenna radiation gain, wherein diagram a in FIG. 5 is a 3D schematic diagram of radiation gain of the antenna after the metal resonant cavity 3 is added, and diagram b in FIG. 5 is a 3D schematic diagram of radiation gain of the antenna before the metal resonant cavity 3 is added. It can be seen from diagrams a and b in FIG. 5 that in diagram a, the radiation gain of the antenna after the metal resonant cavity 3 is added in FIG. 5 is concentrated in an upper region, the upper region is taken as a forward direction of the interactive white board, which can improve the forward radiation ability of the antenna assembly, and in diagram b, the radiation gain of the antenna before the metal resonant cavity 3 is added is uniformly distributed in the upper and lower regions.

Figure 6:
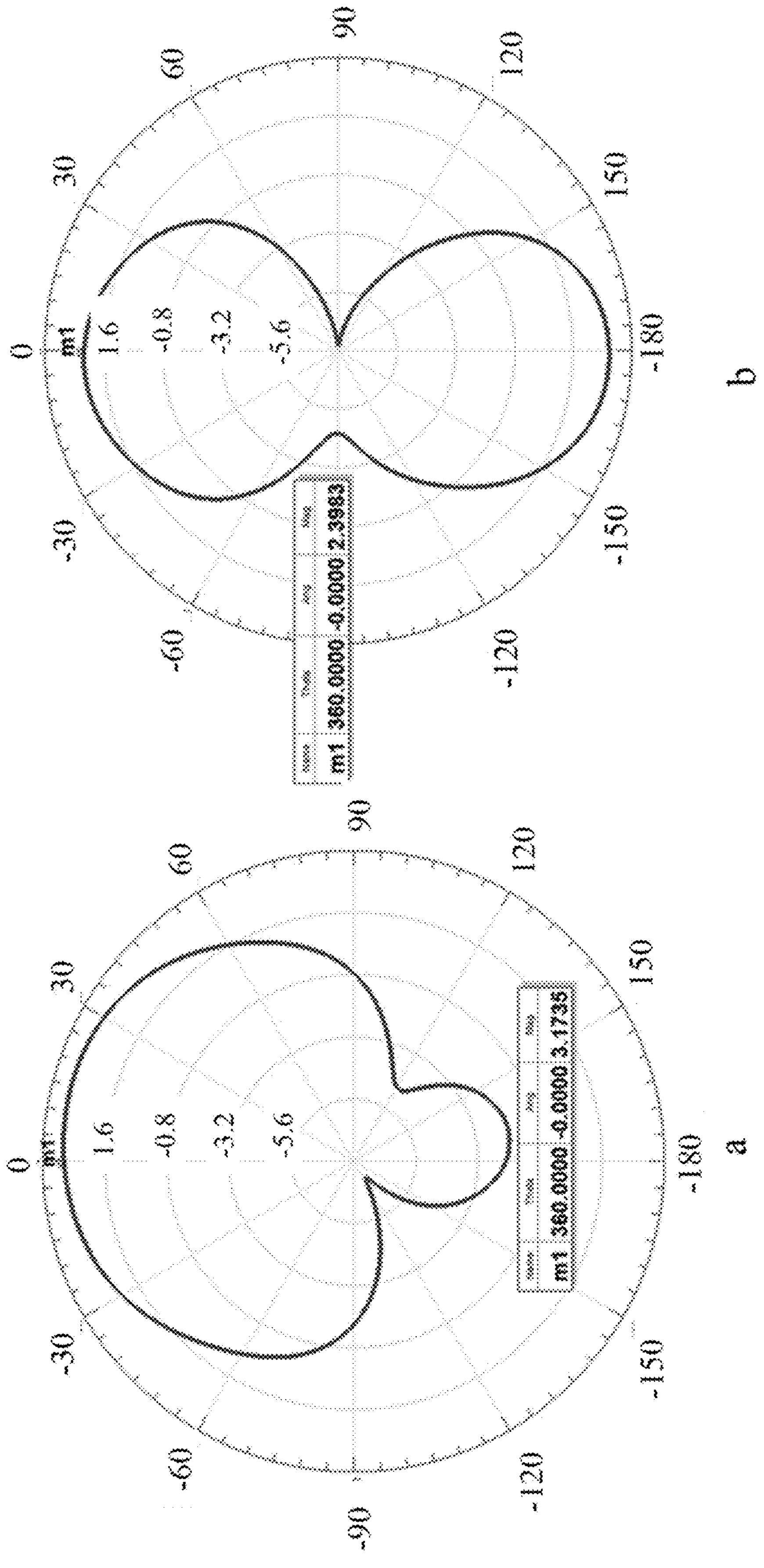
FIG. 6 illustrates 2D schematic diagrams of radiation gain of the antenna assembly before and after the metal resonant cavity is added according to the embodiment of the present disclosure.

FIG. 6 illustrates 2D schematic diagrams of antenna radiation gain. Therein, in FIG. 6, diagram a is a 2D schematic diagram of radiation gain of the antenna after the metal resonant cavity 3 is added, and diagram b is a 2D schematic diagram of radiation gain of the antenna before the metal resonant cavity 3 is added. It can be seen from diagrams a and b in FIG. 6 that in diagram a, the radiation gain of the antenna after the metal resonant cavity 3 is added reaches 3.1735 dB, and in diagram b, the radiation gain of the antenna before the metal resonant cavity 3 is added is 2.3983 dB. That is, the radiation gain increases significantly after the metal resonant cavity 3 is added.

In the antenna assembly according to this embodiment of the present disclosure, the first surface of the dielectric substrate is provided with the ground plane and the closed clearance region located in the ground plane, the first antenna unit and the second antenna unit are spaced apart on the first surface of the dielectric substrate and located in the clearance region, the radio frequency chip is arranged on the dielectric substrate, and connected with the first antenna unit and the second antenna unit respectively, the metal resonant cavity is arranged on the second surface of the dielectric substrate, and in the direction perpendicular to the second surface, at least a part of the projection of the clearance region on the metal resonant cavity is within an outer contour of the metal resonant cavity. When the antenna assembly is installed on the interactive white board, the antenna assembly can be located in the interactive white board and connected with the frame. The first surface, which is not provided with the metal resonant cavity, of the dielectric substrate in the antenna assembly faces the frame, so that the electromagnetic wave radiated by the antenna unit to the inside of the metal resonant cavity is reflected by the metal resonant cavity, and the reflected electromagnetic wave is radiated toward the direction of the first surface, and thus realizing that the antenna assembly radiates the electromagnetic wave to the side, which is provided with the first surface, of the dielectric substrate, and enhancing an intensity of the electromagnetic wave radiated from the side which is provided with the first surface. Moreover, the first antenna unit and the second antenna unit are arranged orthogonally, and the isolation between the first antenna unit and the second antenna unit is high and the first antenna unit and the second antenna unit do not interfere with each other, thereby improving the radiation performance of the entire antenna assembly. In addition, the antenna unit is arranged in a closed clearance region, and thus wiring of the antenna unit can be simplified to reduce an area of the dielectric substrate, so that the antenna assembly can be made smaller.

In some embodiments of the present disclosure, the radio frequency chip 4 may be arranged on a second surface A of the dielectric substrate 1, and the first antenna unit 21 and the second antenna unit 22 may be arranged on the first surface B of the dielectric substrate 1. Since the radio frequency chip 4 and the antenna unit 2 are located on two different surfaces of the dielectric substrate 1, the radio frequency chip 4 may connect with the first antenna unit 21 and the second antenna unit 22 through metal vias and transmission lines, so that the radio frequency chip 4, the first antenna unit 21 and the second antenna unit 22 can be arranged by making full use of the space on both sides of the dielectric substrate 1, thereby reducing the area of the dielectric substrate 1. Therefore, the embodiment can be applied to the scene where the radio frequency chip 4, the first antenna unit 21 and the second antenna unit 22 cannot be arranged on the same surface of the dielectric substrate 1 due to the limited overall space of the interactive white board. In addition, the radio frequency chip 4 and the metal resonant cavity 3 are both arranged on the second surface A. During production and manufacture, the radio frequency chip 4 and the metal resonant cavity 3 can be simultaneously arranged on the second surface A of the dielectric substrate 1 through the SMT process, which eliminates the need for additional processes and reduces the manufacturing cost.

Definitely, the radio frequency chip 4 may also be arranged on the first surface B of the dielectric substrate 1, that is, the radio frequency chip 4, the first antenna unit 21 and the second antenna unit 22 are arranged on the same surface of the dielectric substrate 1, and pins of the radio frequency chip 4 can be directly connected with the transmission line without providing metal vias on the dielectric substrate 1, thereby reducing manufacturing cost of the dielectric substrate 1, and meanwhile being applied to the scene where the radio frequency chip 4, the first antenna unit 21 and the second antenna unit 22 are arranged on the same surface of the dielectric substrate 1 due to the limited overall space of the interactive white board. In practical application, those skilled in the art can arrange the radio frequency chip 4, the first antenna unit 21 and the second antenna unit 22 on the same surface or on different surfaces according to actual needs, and the embodiments of the present disclosure are not limited thereto.

In some embodiments of the present disclosure, the first antenna unit 21 and the second antenna unit 22 are electrically connected with the radio frequency chip 4 through a coplanar waveguide transmission line, and the coplanar waveguide transmission line may further be provided with an impedance matching circuit, for example, π-shaped matching circuit. By arranging the impedance matching circuit, the frequency of the antenna assembly can be adjusted after a frequency offset of the antenna assembly, and the antenna assembly can be matched with an active device so as to improve the overall radiation performance of the antenna assembly.

In practical applications, the metal resonant cavity 3 may be provided on the second surface A of the dielectric substrate 1 by welding, buckles, locking screws, etc. In some embodiments, a contact surface between the metal resonant cavity 3 and the dielectric substrate 1 may also be provided with conductive fabric so as to improve the electromagnetic shielding performance of the metal resonant cavity 3.

In some embodiments, a distance from the bottom of the metal resonant cavity 3 to the antenna unit 2 is equal to one fourth of a wavelength of the electromagnetic wave radiated by the antenna unit 2. As shown in FIG. 3, $L=\lambda/4$, wherein L is the distance from the bottom of the metal resonant cavity 3 to the antenna unit 2, and λ is the wavelength of the electromagnetic wave. By setting the distance from the bottom of the metal resonant cavity 3 to the antenna unit 2 to be equal to one fourth of the wavelength of the electromagnetic wave radiated by the antenna unit 2, when the electromagnetic wave radiated by the antenna unit 2 to the bottom of the metal resonant cavity 3 reaches the antenna unit 2 through reflection, the reflected electromagnetic wave and the electromagnetic wave radiated by the antenna unit 2 have a same phase. The superposition of the electromagnetic waves in the same phase can improve the signal intensity of the electromagnetic wave, and the forward radiation performance of the entire antenna assembly.

As shown in FIG. 4, in some embodiments of the present disclosure, the radio frequency chip 4 includes a first radio frequency chip 41, the clearance region 12 is provided with grounded stubs for increased isolation 13, the grounded stubs for increased isolation 13 divide the clearance region 12 into a closed first clearance region 121 and a closed second clearance region 122, the first antenna unit 21 is arranged in the first clearance region 121, and the second antenna unit 22 is arranged in the second clearance region 122. In some embodiments, the first antenna unit 21 and the second antenna unit 22 are located on the same side of the first radio frequency chip 41, the first antenna unit 21 is located between the second antenna unit 22 and the first radio frequency chip 41, the first antenna unit 21 is connected with the first radio frequency chip 41 through the first coplanar waveguide transmission line 14, and the second antenna unit 22 is connected with the first radio frequency chip 41 through the second coplanar waveguide transmission line 15.

When the antenna unit 2 according to some embodiments of the present disclosure includes the first antenna unit 21 and the second antenna unit 22, the clearance region 12 is divided into a closed first clearance region 121 and a closed second clearance region 122 by the grounded stubs for increased isolation 13, so that the first antenna unit 21 located in the first clearance region 121 and the second antenna unit 22 located in the second clearance region 122 are isolated, thereby improving the isolation between the first antenna unit 21 and the second antenna unit 22. Thus, the interference between the first antenna unit 21 and the second antenna unit 22 is avoided, the anti-interference ability of the first antenna unit 21 and the second antenna unit 22 is improved, and the radiation performance of the antenna assembly is improved.

It should be noted that when the first radio frequency chip 41, the first antenna unit 21 and the second antenna unit 22 are arranged on the same surface of the dielectric substrate 1, the first radio frequency chip 41 can be directly connected with the first antenna unit 21 and the second antenna unit 22 through the coplanar waveguide transmission lines (14, 15). When the first radio frequency chip 41, the first antenna unit 21 and the second antenna unit 22 are arranged on different surfaces of the dielectric substrate 1, after the coplanar waveguide transmission lines (14, 15) are connected with the first antenna unit 21 and the second antenna unit 22, the coplanar waveguide transmission lines (14, 15) are connected to the first radio frequency chip 41 on the other side through metal vias. Therein, the layout of the coplanar waveguide transmission lines (14, 15) on the dielectric substrate 1 can be determined according to the actual situation, and the embodiments of the present disclosure do not limit the wiring of the coplanar waveguide transmission lines (14, 15).

In some embodiments, when the grounded stubs for increased isolation 13 divide the clearance region 12 into a closed first clearance region 121 and a closed second clearance region 122, the first antenna unit 21 is arranged in the first clearance region 121, and the second antenna unit 22 is arranged in the second clearance region 122, the projection of the first clearance region 121 or the second clearance region 122 on the metal resonant cavity 3 is within the outer contour of the metal resonant cavity 3, so that the electromagnetic wave radiated from the first antenna unit 21 or the second antenna unit 22 toward the metal resonant cavity 3 is reflected by the inner wall of the metal resonant cavity 3, thereby enhancing the intensity of the electromagnetic wave radiated toward the side F.

In order to enable those skilled in the art to understand the antenna assembly of the embodiment of the present disclosure more clearly, the antenna assembly of the embodiment of the present disclosure will be described hereinafter with reference to FIG. 4.

As shown in FIG. 4, the first clearance region 121 in the ground plane 11 is a square clearance region, the first antenna unit 21 includes a first feeder stub 211 and a first ground stub 212, the first feeder stub 211 extends from a first boundary 1211 of the first clearance region 121 to the inside of the first clearance region 121, and an end of the first feeder stub 211 close to the first boundary 2111 is connected with the first radio frequency chip 41 through the first coplanar waveguide transmission line 14. The first ground stub 212 extends from a second boundary 1212 of the first clearance region 121 to the inside of the first clearance region 121. The first boundary 1211 and the second boundary 1212 are two adjacent boundaries of the first clearance region 121. The first feeder stub 211 and the first ground stub 212 are arranged orthogonally and have no public endpoint. The first feeder stub 211 is perpendicular to the first boundary 1211. Therein, the orthogonal arrangement may mean that the first feeder stub 211 is perpendicular to the first ground stub 212.

The second clearance region 122 is a square clearance region, and the second antenna unit 22 includes a second feeder stub 221 and a second ground stub 222. The second feeder stub 221 extends from a third boundary 1221 of the second clearance region 122 to the inside of the second clearance region 122. One end of the second feeder stub 221 close to the third boundary 1221 is connected with the first radio frequency chip 41 through the second coplanar waveguide transmission line 15. The second ground stub 222 extends from a fourth boundary 1222 of the second clearance region 122 to the inside of the second clearance region 122. The third boundary 1221 and the fourth boundary 1222 are two adjacent boundaries of the second clearance region 122. The second feeder stub 221 and the second ground stub 222 are arranged orthogonally and have no public endpoint.

The second feeder stub 221 is perpendicular to the third boundary 1221.

It should be noted that the first boundary 1211 and the third boundary 1221 may be orthogonal or parallel. The first boundary 1211 and the third boundary 1221 are orthogonal, so that the radiation directions of the first antenna unit 21 and the second antenna unit 22 are orthogonal, the first antenna unit 21 and the second antenna unit 22 do not interfere with each other, and the degree of isolation is high.

As the two antenna units shown in FIG. 4, the first antenna unit 21 and the second antenna unit 22 respectively include a feeder stub for feeder and a ground stub for ground, and the two stubs are placed orthogonally. The feeder stub is in the form of a monopole antenna. According to the antenna radiation principle, when a length of the feeder stub is about one fourth of the wavelength of the radiation frequency, the electric field intensity at the top of the feeder stub is the strongest. In some embodiments of the present disclosure, after the ground stub is introduced at an orthogonal side of the feeder stub, the ground stub can be coupled with the feeder stub to change the radiation frequency, so that by adjusting the position and length of the ground stub, a current path length of the feeder stub can be effectively shortened by using the coupling effect, thereby reducing the size of the feeder stub. The size of the feeder stub shown in FIG. 4 is about one eighth of the wavelength of the radiation frequency, the size of the antenna unit is greatly reduced, so that the required clearance area of the antenna unit can be smaller, and the size of the antenna assembly can be made smaller. Moreover, the antenna unit includes two stubs, and the structure is simple.

Figure 7:
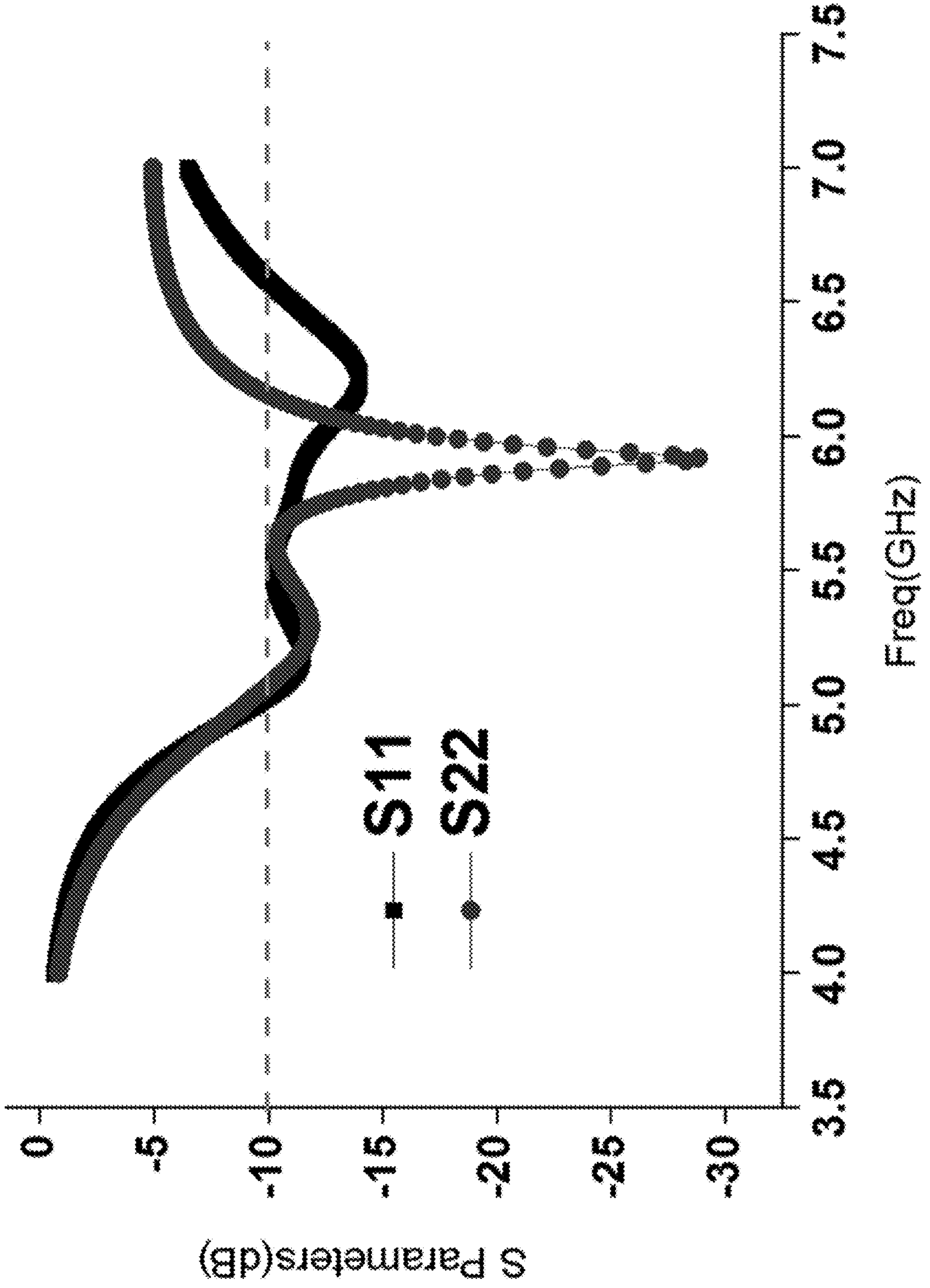
FIG. 7 is a schematic diagram of a return loss of the antenna assembly in FIG. 4.

FIG. 7 is a schematic diagram of the return loss of the antenna assembly in FIG. 4. It can be seen from FIG. 7 that the return loss of the two antenna elements in FIG. 4 meets 5.15-5.85 GHz at an impedance bandwidth with less than-10 dB.

It should be noted that although the structures of the first antenna unit 21 and the second antenna unit 22 have been exemplified with reference to FIG. 4, in practical applications, those skilled in the art can also arrange the first antenna unit 21 and the second antenna unit 22 with any structure. Hereinafter, the other two antenna units of the present disclosure will be described with reference to FIGS. 8 and 9.

Figure 8:
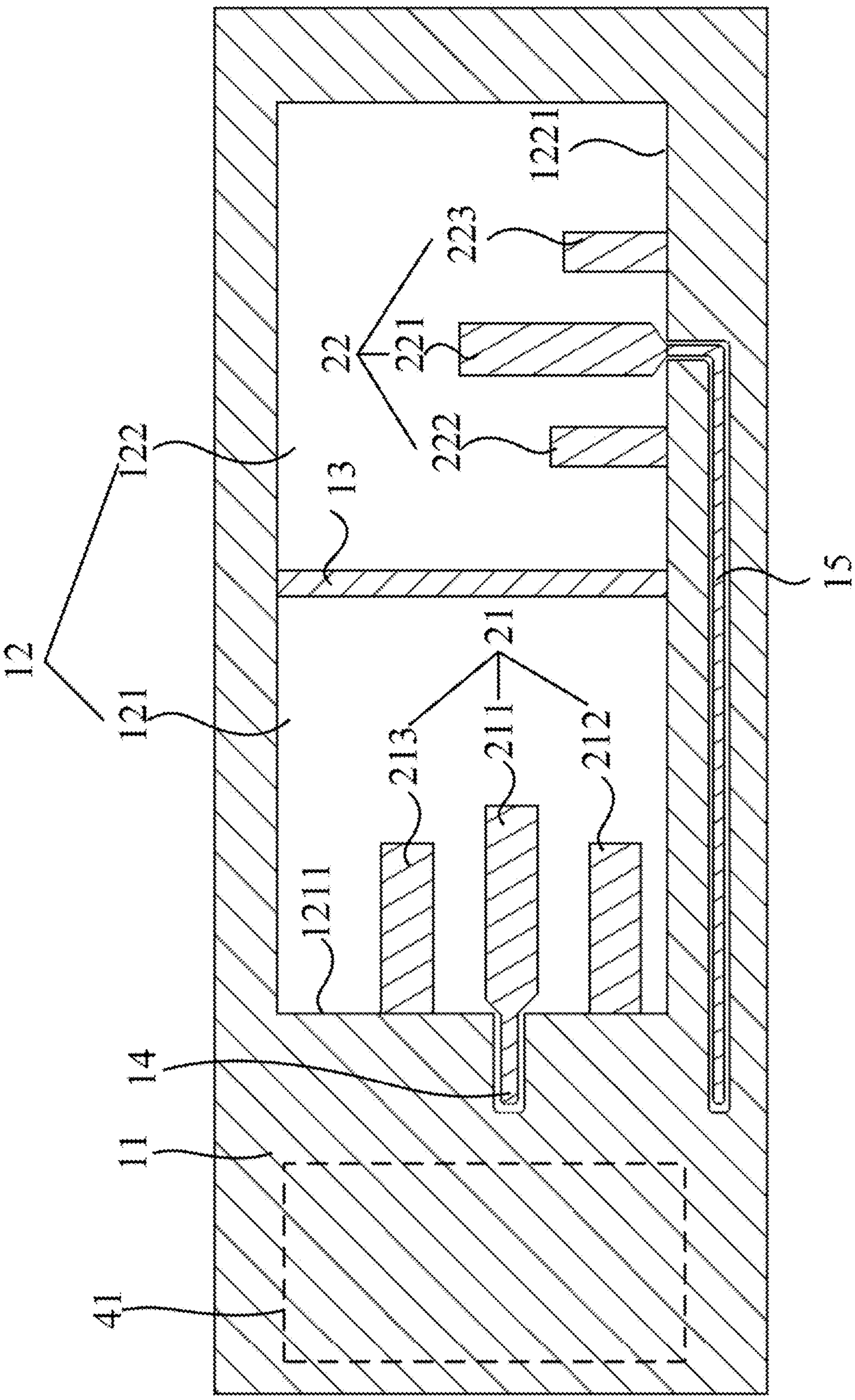
FIG. 8 is a schematic diagram of a structure of an antenna unit according to another embodiment of the present disclosure.

As shown in FIG. 8, in some embodiments, the first clearance region 121 is a square clearance region, and the first antenna unit 21 includes a first feeder stub 211, a first ground stub 212, and a third ground stub 213 arranged in parallel. The first feeder stub 211, the first ground stub 212, and the third ground stub 213 all extend from the first boundary 1211 of the first clearance region 121 to the inside of the first clearance region 121. One end of the first feeder stub 211 close to the first boundary 1211 is connected with the first clearance region chip 41 through the first coplanar waveguide transmission line 14. The first ground stub 212 and the third ground stub 213 are located on both sides of the first feeder stub 211, and the first feeder stub 211 is perpendicular to the first boundary 1211.

As shown in FIG. 8, the second clearance region 122 is a square clearance region, and the second antenna unit 22 includes a second feeder stub 221, a second ground stub 222 and a fourth ground stub 223 arranged in parallel. The second feeder stub 221, the second ground stub 222 and the fourth ground stub 223 all extend from the third boundary 1221 of the second clearance region 122 to the inside of the second headroom area 122. One end of the second feeder stub 221 close to the third boundary 1221 is connected with the first radio frequency chip 41 through the second coplanar waveguide transmission line 15. The second ground stub 222 and the fourth ground stub 223 are located on both sides of the second feeder stub 221. The second feeder stub 221 is perpendicular to the third boundary 1221. It should be noted that the first boundary 1211 and the third boundary 1221 may be orthogonal or parallel.

Figure 9:
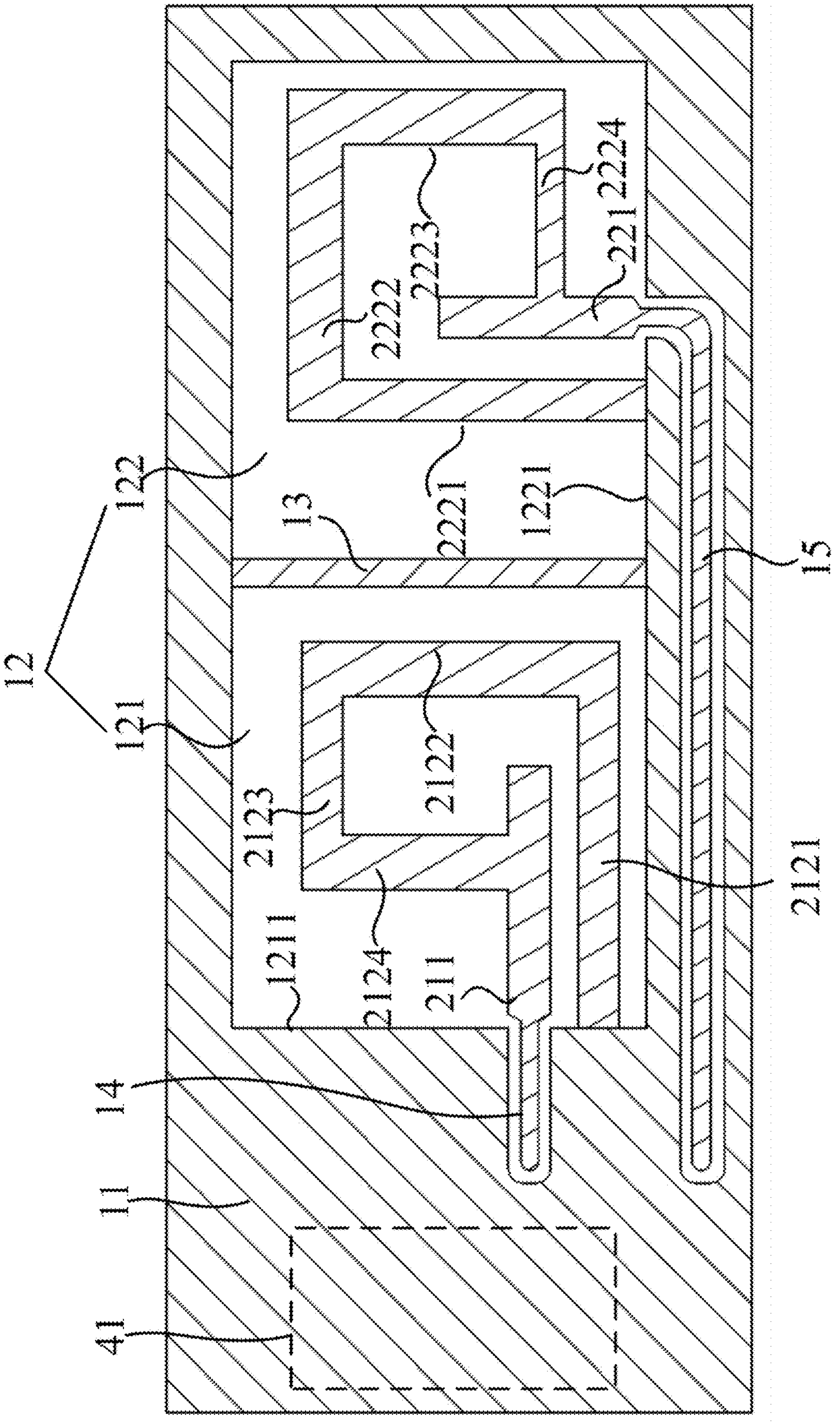
FIG. 9 is a schematic diagram of a structure of an antenna unit according to another embodiment of the present disclosure.

As shown in FIG. 9, the first clearance region 121 is a square clearance region, and the first antenna unit 21 includes a first feeder stub 211 and a first ground stub 212. The first feeder stub 211 extends from the first boundary 1211 of the first clearance region 121 to the inside of the first clearance region 121. One end of the first feeder stub 211 close to the first boundary 1211 is connected with the first radio frequency chip 41 through the first coplanar waveguide transmission line 14.

The first ground stub 212 includes a first ground sub-stub 2121, a second ground sub-stub 2122, a third ground sub-stub 2123, and a fourth ground sub-stub 2124. The first ground sub-stub 2121 is parallel to the first feeder stub 211 and extends from the first boundary 1211 of the first clearance region 121 to the inside of the first clearance region 121. The second ground sub-stub 2122, the third ground sub-stub 2123, and the fourth ground sub-stub 2124 are connected end-to-end in sequence, and two adjacent ground sub-stubs are perpendicular to each other. One end, which is not connected with the third ground sub-stub 2123, of the second ground sub-stub 2122 is connected to another end, which is away from the first boundary 1211, of the first ground sub-stub 2121, and the second ground sub-stub 2122 is perpendicular to the first ground sub-stub 2121. One end, which is not connected with the third ground sub-stub 2123, of the fourth ground sub-stub 2124 is connected with the first feeder stub 211, and the first ground sub-stub 2121 and the third ground sub-stub 2123 are respectively located on both sides of the first feeder stub 211.

As shown in FIG. 9, the second clearance region 122 is a square clearance region, and the second antenna unit 22 includes a second feeder stub 221 and a second ground stub 222. The second feeder stub 221 extends from the third boundary 1221 of the second clearance region 122 to the inside of the second clearance region 122. One end of the second feeder stub 221 close to the third boundary 1221 is connected with the first radio frequency chip 41 through the second coplanar waveguide transmission line 15.

The second ground stub 222 includes a fifth ground sub-stub 2221, a sixth ground sub-stub 2222, a seventh ground sub-stub 2223, and an eighth ground sub-stub 2224. The fifth ground sub-stub 2221 is parallel to the second feeder stub 221 and extends from the third boundary 1221 of the second clearance region 122 to the inside of the second clearance region 122. The sixth ground sub-stub 2222, the seventh ground sub-stub 2223, and the eighth ground sub-stub 2224 are connected end-to-end in sequence, and two adjacent ground sub-stubs are perpendicular to each other. One end, which is not connected with the seventh ground sub-stub 2223, of the sixth ground sub-stub 2222 is connected to another end, which is away from the third boundary 1221, of the fifth ground sub-stub 2221, and the sixth ground sub-stub 2222 is perpendicular to the fifth ground sub-stub 2221. One end, which is not connected with the seventh ground sub-stub 2223, of the eighth ground sub-stub 2224 is connected with the second feeder stub 221. The fifth ground sub-stub 2221 and the seventh ground sub-stub 2223 are respectively located on both sides of the second feeder stub 221. It should be noted that the first boundary 1211 and the third boundary 1221 may be orthogonal or parallel.

Although the structure of the antenna unit 2, the structure and wiring of the transmission line have been described above by taking the example that the antenna unit 2 includes two antenna units and the transmission line is a coplanar waveguide transmission line, in practical applications, those skilled in the art can arrange the number of antenna units 2, design antenna units with different structures and transmission lines with different layouts according to actual needs, and the embodiments of the present disclosure do not limit the number and structure of antenna units, the structure and wiring mode of the transmission line are not limited.

Figure 10:
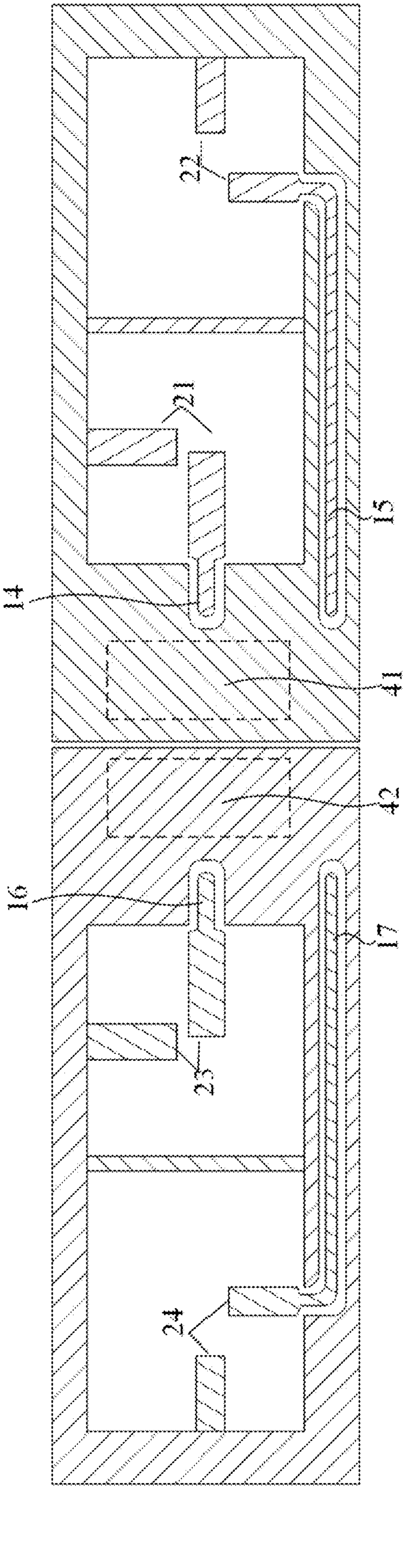
FIG. 10 is a schematic diagram of a layout of an antenna unit in an antenna assembly according to another embodiment of the present disclosure.

FIG. 10 is a schematic diagram of another antenna assembly in the example of the present disclosure. In addition to the first antenna unit 21, the second antenna unit 22 and the first radio frequency chip 41 shown in FIG. 4, 8 or 9, the antenna assembly in some embodiments of the present disclosure further includes a third antenna unit 23 and a fourth antenna unit 24, the radio frequency chip 4 further includes a second radio frequency chip 42, and the coplanar waveguide transmission line further includes a third coplanar waveguide transmission line 16 and a fourth coplanar waveguide transmission line 17. Therein, the second radio frequency chip 42 is located on a side of the first radio frequency chip 41 away from the first antenna unit 21, the third antenna unit 23 and the fourth antenna unit 24 are located on a side of the second radio frequency chip 42 away from the first radio frequency chip 41, the third antenna unit 23 is located between the second radio frequency chip 42 and the fourth antenna unit 24, the third antenna unit 23 and the first antenna unit 21 are mirror images of each other, the fourth antenna unit 24 and the second antenna unit 22 are mirror images of each other, the third antenna unit 23 is connected with the second radio frequency chip 42 through the third coplanar waveguide transmission line 16, and the fourth antenna unit 24 is connected with the second radio frequency chip 42 through the fourth coplanar waveguide transmission line 17. Therein, being the mirror image of each other may mean that the third antenna unit 23 and the first antenna unit 21 are mirror images of each other in structure, the fourth antenna unit 24 and the second antenna unit 22 are mirror images of each other in structure. Definitely, the structures of the third antenna unit 23 and the fourth antenna unit 24 may also be other structures, and the embodiments of the present disclosure are not limited thereto.

The antenna assembly according to the embodiment of the present disclosure includes a first antenna unit 21, a second antenna unit 22, a third antenna unit 23, a fourth antenna unit 24, a first radio frequency chip 41, and a second radio frequency chip 42. The second radio frequency chip 42 is located on a side of the first radio frequency chip 41 away from the first antenna unit 21, the third antenna unit 23 and the fourth antenna unit 24 are located on a side of the second radio frequency chip 42 away from the first radio frequency chip 41, and the third antenna unit 23 is located between the second radio frequency chip 42 and the fourth antenna unit 24. On the one hand, the antenna assembly includes a first group of antennas units (the first antenna unit 21 and the second antenna unit 22) and a second group of antenna units (the third antenna unit 23 and the fourth antenna unit 24), and can realize different communication functions through the two groups of antennas. For example, the antenna assembly can realize the WiFi communication functions through the first group of antennas units, and realize the wireless Access Point (AP) function through the second group of antenna units. On the other hand, there are two radio frequency chips (first radio frequency chip 41 and second radio frequency chip 42) between the first group of antennas units (the first antenna unit 21 and the second antenna unit 22) and the second group of antenna units (the third antenna unit 23 and the fourth antenna unit 24). The distance between the two groups of antennas is large, the isolation of the two groups of antennas is high, and the area of the entire antenna assembly is small.

Figure 11:
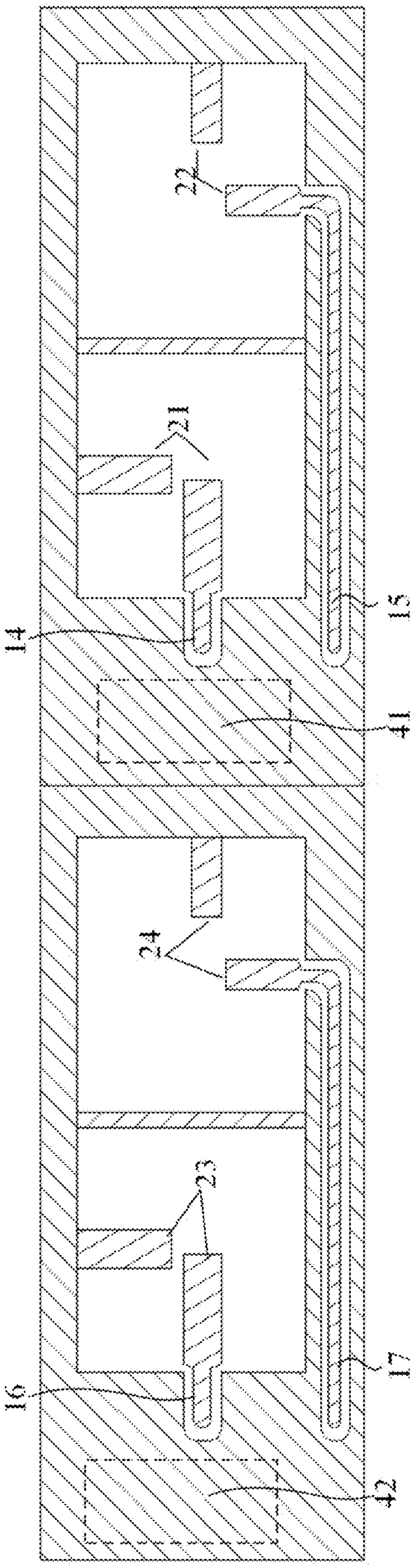
FIG. 11 is a schematic diagram of a layout of an antenna unit in an antenna assembly according to another embodiment of the present disclosure.

FIG. 11 is a schematic diagram of another antenna assembly according to an embodiment of the present disclosure. In addition to the first antenna unit 21, the second antenna unit 22 and the first radio frequency chip 41 shown in FIG. 4, 8 or 9, the antenna assembly of this embodiment in the present disclosure further includes the third antenna unit 23 and the fourth antenna unit 24, the radio frequency chip 4 further includes the second radio frequency chip 42, and the coplanar waveguide transmission line further includes the third coplanar waveguide transmission line 16 and the fourth coplanar waveguide transmission line 17. Therein, the second radio frequency chip 42 is located on a side of the first radio frequency chip 41 away from the first antenna unit 21, the third antenna unit 23 and the fourth antenna unit 24 are located between the second radio frequency chip 42 and the first radio frequency chip 41, the third antenna unit 23 has the same structure as the first antenna unit 21, the fourth antenna unit 24 has the same structure as the second antenna unit 22, the third antenna unit 23 is located between the second radio frequency chip 42 and the fourth antenna unit 24, the third antenna unit 23 is connected with the second radio frequency chip 42 through the third coplanar waveguide transmission line 16, and the fourth antenna unit 24 is connected with the second radio frequency chip 42 through the fourth coplanar waveguide transmission line 17. Definitely, the structures of the third antenna unit 23 and the fourth antenna unit 24 may also be other structures, and the embodiments of the present disclosure are not limited thereto.

The antenna assembly according to the embodiment of the present disclosure includes a first antenna unit 21, a second antenna unit 22, a third antenna unit 23, a fourth antenna unit 24, a first radio frequency chip 41 and a second radio frequency chip 42. The second radio frequency chip 42 is located on a side of the first radio frequency chip 41 away from the first antenna unit 21. The third antenna unit 23 and the fourth antenna unit 24 are located between the second radio frequency chip 42 and the first radio frequency chip 41. On the one hand, the antenna assembly includes a first group of antennas units (the first antenna unit 21 and the second antenna unit 22) and a second group of antenna units (the third antenna unit 23 and the fourth antenna unit 24), and can realize different communication functions through the two groups of antennas. For example, the antenna assembly can realize the WiFi communication function through the first group of antennas units, and realize the wireless AP function through the second group of antenna units. On the other hand, the isolation of the two groups of antennas can be improved by increasing the distance between the first group of antennas units (the first antenna unit 21 and the second antenna unit 22) and the second group of antenna units (the third antenna unit 23 and the fourth antenna unit 24). The increase of the area of the dielectric substrate is suitable for scenes where the installation space of the antenna components is not limited.

Figure 12:
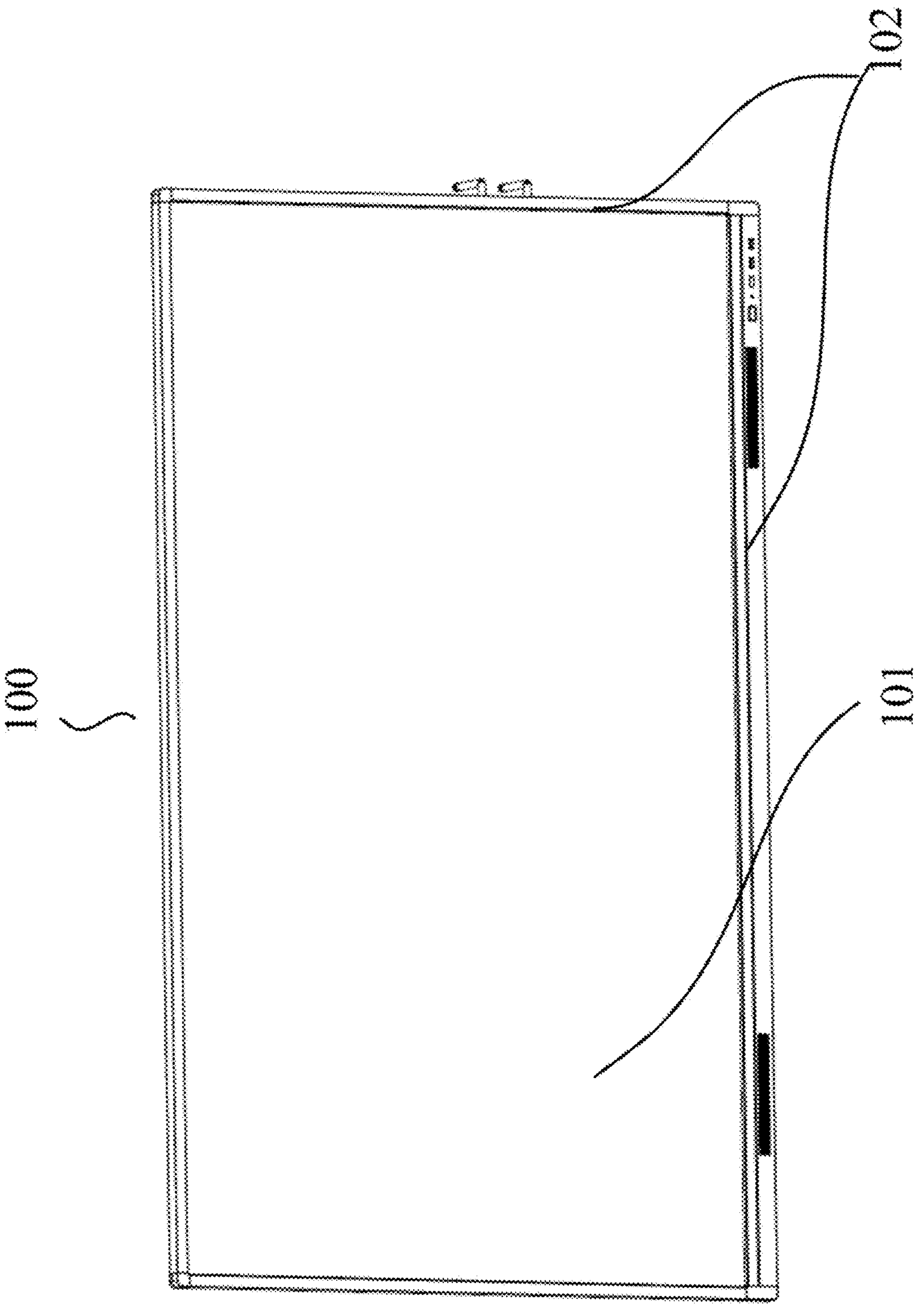
FIG. 12 is a schematic diagram of a front structure of the interactive white board according to the present disclosure.
Figure 13:
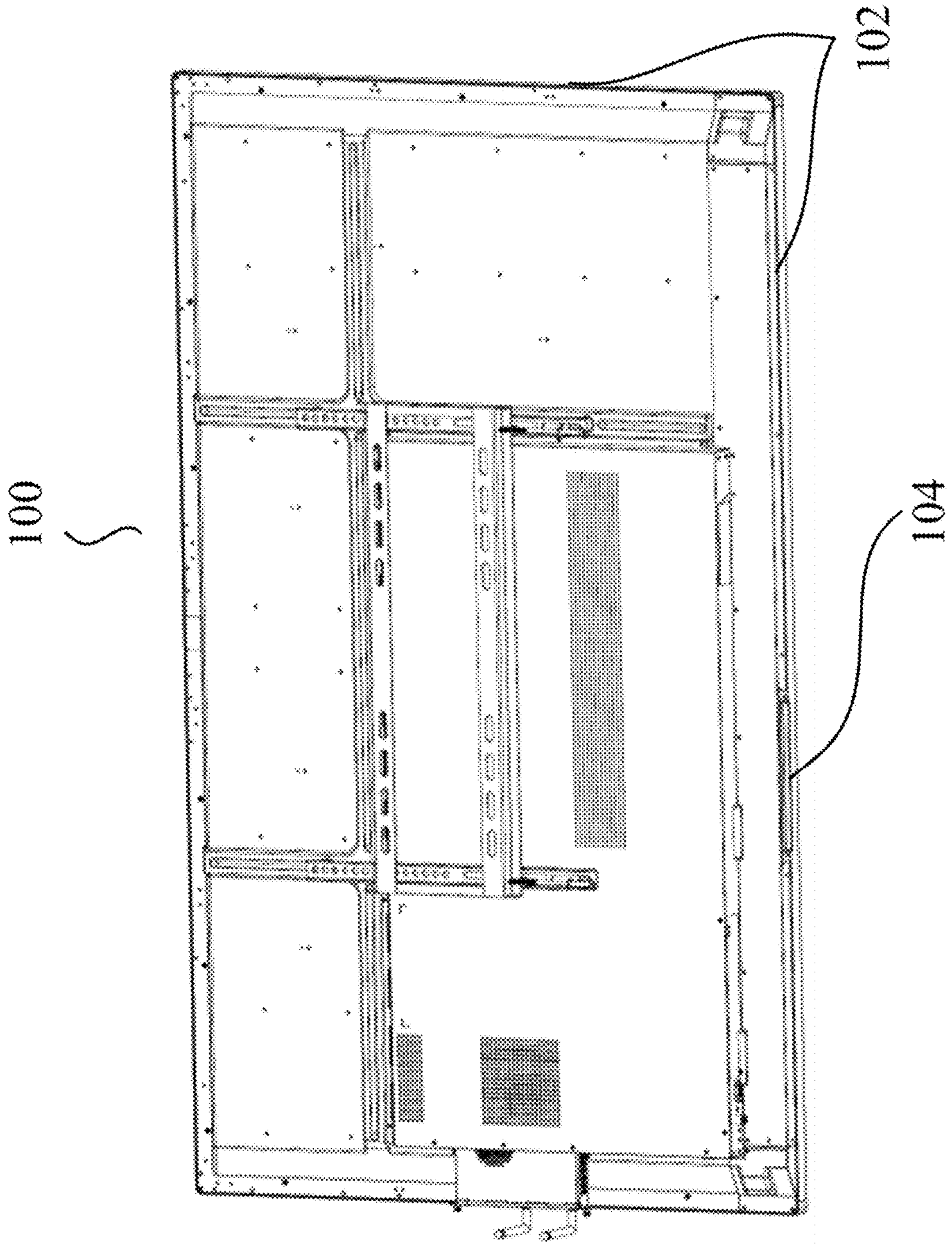
FIG. 13 is a schematic diagram of a back structure of the interactive white board according to the present disclosure.
Figure 14:
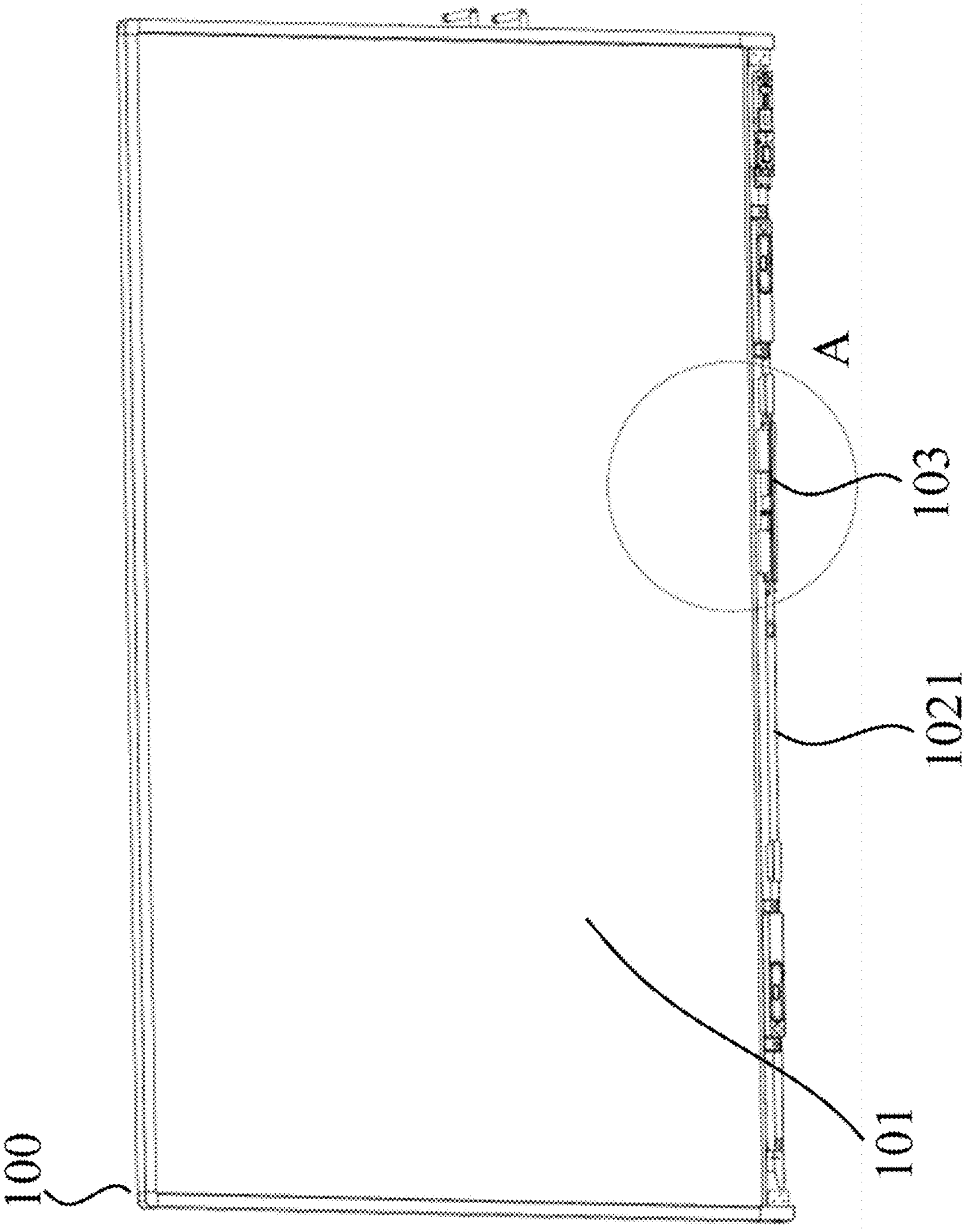
FIG. 14 is a partial exploded schematic diagram of an installation position of the antenna assembly according to the embodiment of the present disclosure.

As shown in FIGS. 12-14, the embodiment of the present disclosure provides an interactive white board 100, and the interactive white board 100 includes a display screen 101, a frame 102 arranged around the display screen 101, and at least one antenna assembly 103 provided in the embodiment of the present disclosure. The antenna assembly 103 is located in the interactive white board 100 and connected to the frame 102, wherein a surface, which is not provided with a metal resonant cavity, of the dielectric substrate in the antenna assembly 103 faces the frame 102. That is, the antenna assembly 103 radiates electromagnetic waves to the outside of the interactive white board 100.

In some embodiments, the display screen 101 may be one of display screen selected from the group consisting of Liquid Crystal Display (LCD), Light-Emitting Diode (LED), Organic Light-Emitting Diode (OLED), etc. The frame 102 may be a frame surrounding the display screen 101. The frame 102 has a certain thickness in the direction perpendicular to the display screen 101, so that the antenna assembly 103 may be mounted on the frame 102. In some embodiments, the number of antenna assemblies 103 may be one or more.

In the interactive white board according to the embodiment of the present disclosure, the first surface of the dielectric substrate is provided with a ground plane and a closed clearance area located in the ground plane, the antenna unit is arranged on the first surface of the dielectric substrate and is located in the clearance area, the radio frequency chip is provided on the dielectric substrate and connected with the antenna unit, the metal resonant cavity is provided on the second surface of the dielectric substrate, and the projection of the metal resonant cavity on the first surface covers the antenna unit. When the antenna assembly is installed on the interactive white board, the antenna assembly can be located in the interactive white board and connected with the frame. The first surface, which is not provided with the metal resonant cavity, of the dielectric substrate in the antenna assembly faces the frame, so that the electromagnetic wave radiated by the antenna unit to the inside of the metal resonant cavity is reflected by the metal resonant cavity, and the reflected electromagnetic wave is radiated toward the first surface. Therefore, the antenna assembly radiates electromagnetic waves to the side of the dielectric substrate which is provided with the first surface, and the intensity of electromagnetic waves radiated from the surface of the dielectric substrate which is provided with the first surface is enhanced. In addition, the antenna unit is arranged in a closed clearance area, and wiring of the antenna unit can be simplified so as to reduce the area of the dielectric substrate, and thus the antenna assembly can be made smaller and the frame of the interactive white board can be made narrower.

Furthermore, the number of antenna units in the antenna assembly may be one or more, the antenna unit and the radio frequency chip may be arranged on the same or different surfaces of the dielectric substrate, and the interactive white board may select the antenna assembly according to the installation space, radiation performance and radiation direction of the antenna assembly.

Figure 15:
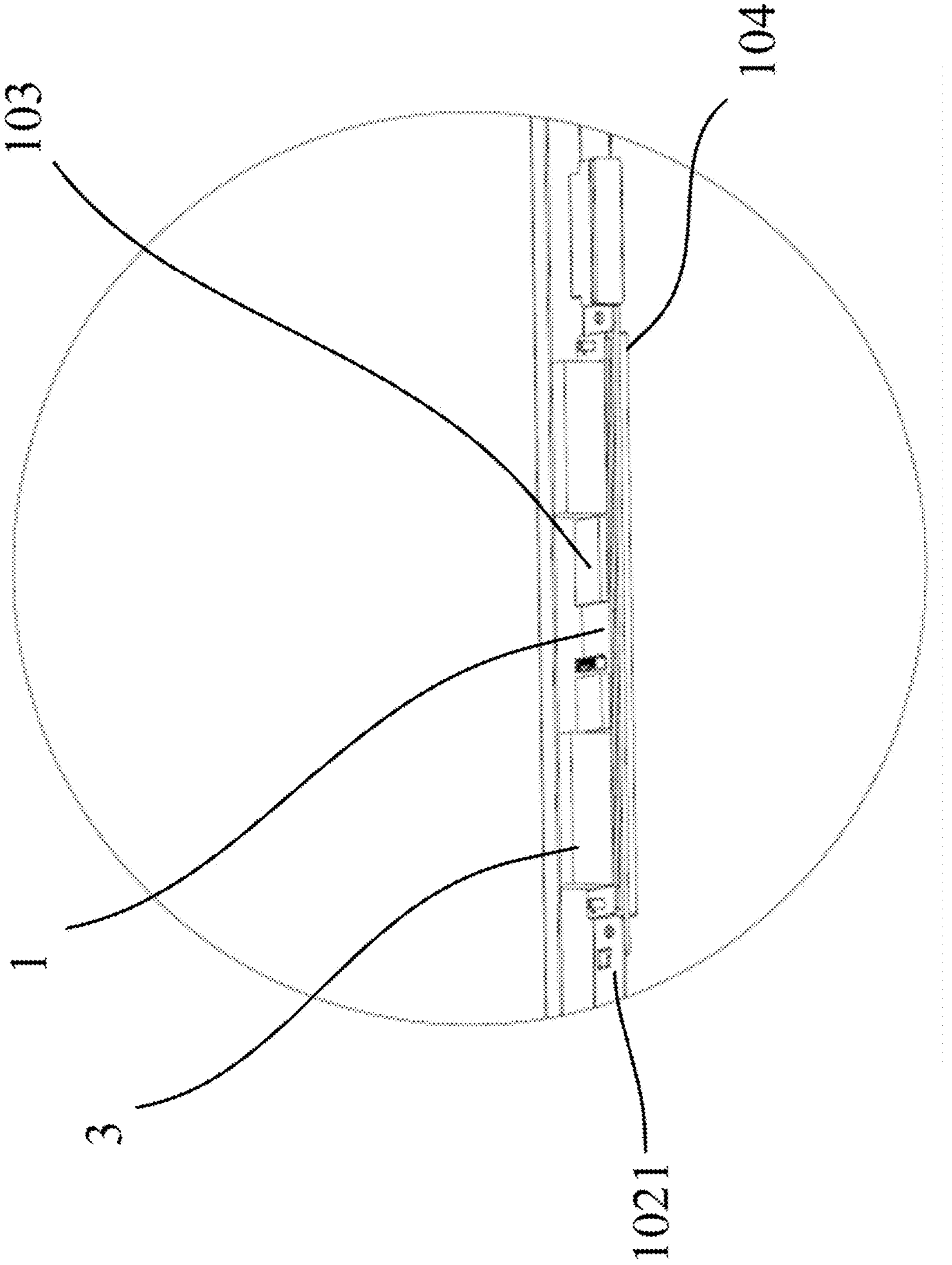
FIG. 15 is an enlarged schematic diagram of part A in FIG. 14.
Figure 16:
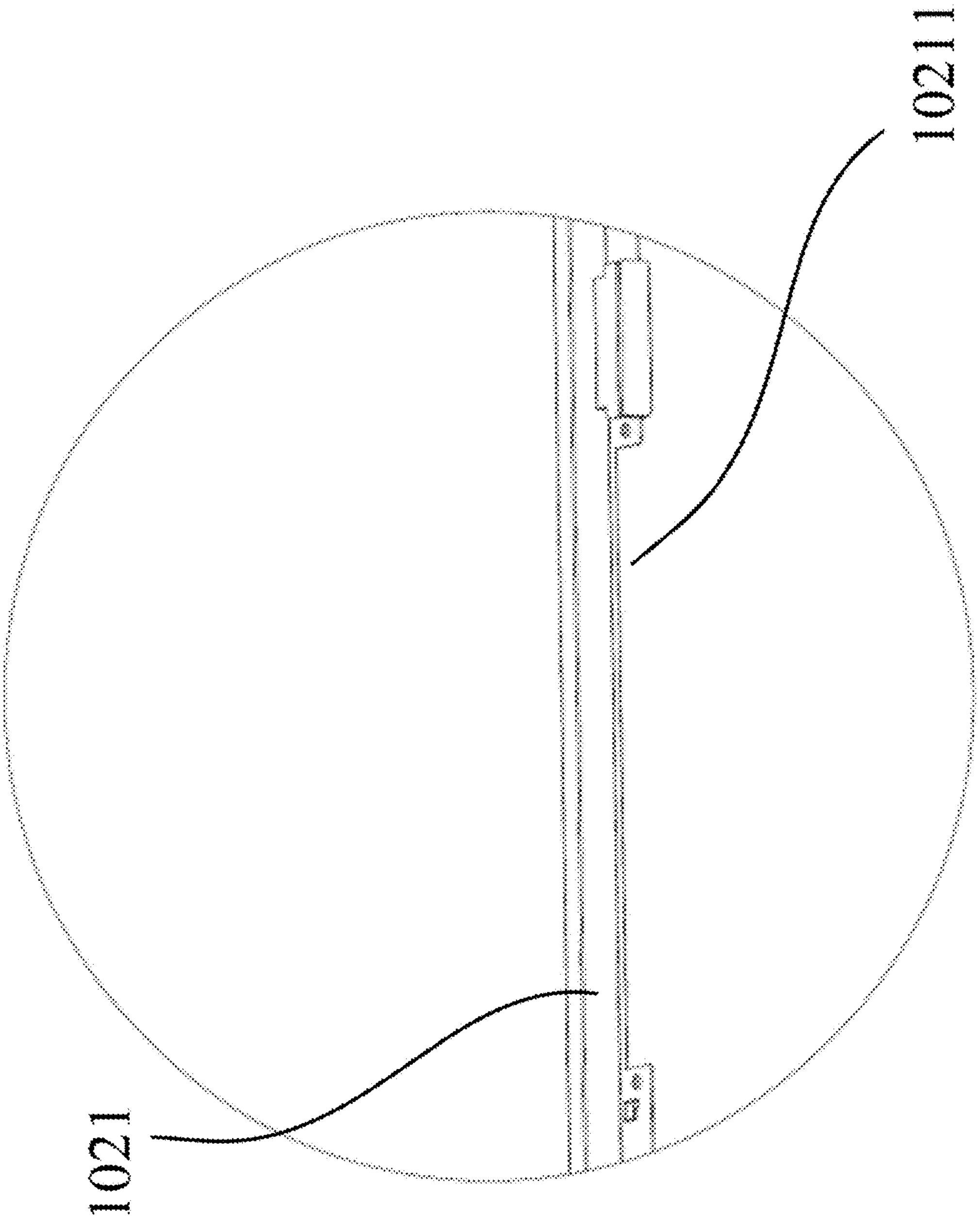
FIG. 16 is a schematic diagram of an avoidance hole of a lower frame in the part A in FIG. 14.
Figure 17:
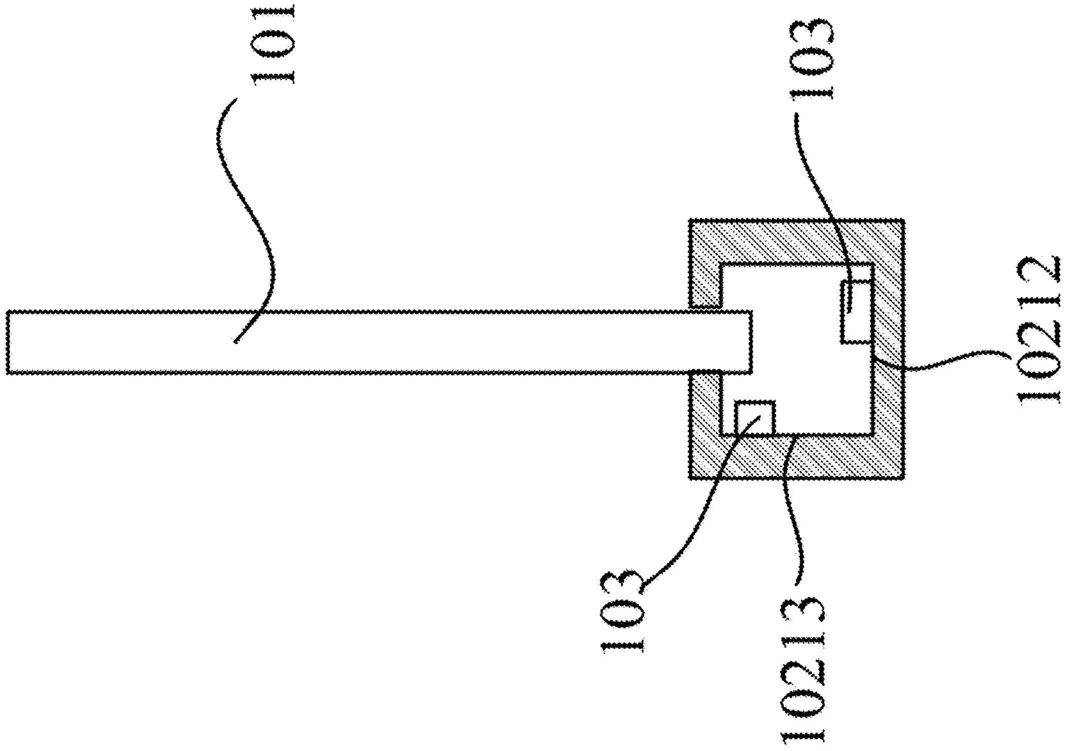
FIG. 17 is a schematic diagram of the location of the antenna assembly and the lower frame.

As shown in FIGS. 14-16, in an embodiment, the frame 102 of the interactive white board 100 includes a lower frame 1021, and the antenna assembly 103 is detachably connected with the lower frame 1021. One surface, which is provided with the metal resonant cavity 3, of the dielectric substrate 1 in the antenna assembly 103 faces a bottom surface 10212 of the lower frame 1021, and the bottom surface 10212 is substantially perpendicular to the display screen 101. For example, as shown in FIG. 17, when the interactive white board 100 is placed on a horizontal plane, the bottom surface 10212 of the lower frame 1021 may be a surface substantially parallel to the horizontal plane. In some embodiments, the material of the lower frame 1021 may be metal, and the bottom surface 10212 of the lower frame 1021 is provided with an avoidance hole 10211 directly facing the antenna assembly 103, so that after the antenna assembly 103 is mounted on the lower frame 1021, the surface, which is not provided with the metal resonant cavity 3, of the dielectric substrate 1 in the antenna assembly 103 directly faces the avoidance hole 10211, and the antenna unit on the antenna assembly 103 can radiate electromagnetic waves to the outside of the interactive white board 100 through the avoidance hole 10211. The surface, which is not provided with the metal resonant cavity 3, of the dielectric substrate 1 in the antenna assembly 103 is arranged toward the bottom surface 10212 of the lower frame 1021. A surface of the lower frame 1021 facing the user does not need to be provided with an avoidance hole, so that the interactive white board has a good appearance.

As shown in FIG. 17, in another example, the surface, which is not provided with the metal resonant cavity 3, of the dielectric substrate 1 in the antenna assembly 103 faces a side surface 10213 of the lower frame 1021, wherein the side surface 10213 is parallel to the display screen 101. In some embodiments, when the interactive white board 100 is placed on a horizontal plane, the side surface 10213 of the lower frame 1021 may be a plane substantially perpendicular to the horizontal plane, for example, the side surface 10213 of the lower frame 1021 may be a surface facing the forward direction of the interactive white board, so that the antenna assembly 103 radiates electromagnetic waves directly toward the forward direction of the interactive white board.

Definitely, the antenna assembly 103 may also be mounted on other frames of the interactive white board 100. For example, the antenna assembly 103 can be mounted on the left frame or the right frame. The surface, which is not provided with the metal resonant cavity 3, of the dielectric substrate 1 in the antenna assembly 103 can also be in the same direction as the front of the display screen 101. The embodiment of the present disclosure does not limit the mounting position and orientation of the antenna assembly 103.

The antenna assembly according to the embodiment of the present disclosure is located at the lower frame of the interactive white board. The surface, which is not provided with a metal resonant, of the dielectric substrate 1 in the antenna assembly faces the bottom surface of the lower frame. On the one hand, the lower frame has sufficient installation space, which can facilitate the installation of the antenna assembly. On the other hand, the lower frame of the interactive white board is closer to the user, and the antenna assembly being located at the lower frame improves a wide radiation area, which improves the wireless network performance of the interactive white board.

In some embodiments, the interactive white board 100 further includes a decorative piece 104, which covers the avoidance hole 10211 so as to prevent the avoidance hole 10211 from directly exposing the dielectric substrate 1 of the antenna assembly 103, so that the interactive white board 100 has a good appearance.

In the explanation of this description, the description with reference to the terms "embodiment," "example," etc. means that the concrete feature, structure, material or characteristic described in conjunction with the embodiment or example is contained in at least one embodiment or example of the present disclosure. In this description, the schematic representation of the above-mentioned terms does not necessarily refer to the same embodiment or example.

In addition, it should be understood that although this description is described in accordance with the implementation approaches, not each implementation approach only contains an independent technical solution, and this narration approach in the description is only for clarity of the device. Those skilled in the art should regard the description as a whole, and the technical solutions in the various embodiments can also be appropriately combined to form other implementation approaches that can be understood by those skilled in the art.

The technical principle of the present disclosure has been described above in combination with concrete embodiments. These descriptions are only for the purpose of explaining the principles of the present disclosure and cannot be interpreted in any way as limiting the claimed scope of the present disclosure. Based on the explanation herein, those skilled in the art can associate other concrete embodiments of the present disclosure without creative labor, which will fall within the claimed scope of the present disclosure.

What is claimed is:

1. An antenna assembly, comprising:

a dielectric substrate, wherein a first surface of the dielectric substrate comprises a ground plane and a closed clearance region located in the ground plane;

an antenna unit comprising a first antenna unit and a second antenna unit, the first antenna unit and the second antenna unit being spaced apart on the first surface of the dielectric substrate and located in the closed clearance region, and the first antenna unit and the second antenna unit being orthogonally arranged;

a radio frequency chip, arranged on the dielectric substrate and connected with the first antenna unit and the second antenna unit respectively; and a metal resonant cavity, arranged on a second surface of the dielectric substrate, wherein in a direction perpendicular to the second surface, at least a part of a projection of the closed clearance region on the metal resonant cavity is within an outer contour of the metal resonant cavity.

2. The antenna assembly according to claim 1, wherein the projection of the closed clearance region on the metal resonant cavity is within the outer contour of the metal resonant cavity.

3. The antenna assembly according to claim 1, wherein grounded stubs of the closed clearance region divide the closed clearance region into a first closed clearance region and a second closed clearance region, the first antenna unit is arranged in the first closed clearance region, and the second antenna unit is arranged in the second closed clearance region.

4. The antenna assembly according to claim 3, wherein a projection of the first closed clearance region or the second closed clearance region on the metal resonant cavity is within the outer contour of the metal resonant cavity.

5. The antenna assembly according to claim 3, wherein the radio frequency chip comprises a first radio frequency chip, the first antenna unit and the second antenna unit are located on a same side of the first radio frequency chip, the first antenna unit is located between the second antenna unit and the first radio frequency chip, the first antenna unit is connected with the first radio frequency chip through a first coplanar waveguide transmission line, the second antenna unit is connected with the first radio frequency chip through a second coplanar waveguide transmission line.

6. The antenna assembly according to claim 5, wherein the first coplanar waveguide transmission line and the second coplanar waveguide transmission line are both provided with an impedance matching circuit.

7. The antenna assembly according to claim 5, wherein a shape of the first closed clearance region is a square, the first antenna unit comprises a first feeder stub and a first ground stub, the first feeder stub extends from a first boundary of the first closed clearance region to the inside of the first closed clearance region, an end of the first feeder stub close to the first boundary is connected with the first radio frequency chip through the first coplanar waveguide transmission line, the first ground stub extends from a second boundary of the first closed clearance region to the inside of the first closed clearance region, the first boundary and the second boundary are two boundaries adjacent to the first closed clearance region, the first feeder stub and the first ground stub are orthogonally arranged and have no public endpoint, and the first feeder stub is perpendicular to the first boundary.

8. The antenna assembly according to claim 7, wherein a shape of the second closed clearance region is a square, the second antenna unit comprises a second feeder stub and a second ground stub, the second feeder stub extends from a third boundary of the second closed clearance region to the inside of the second closed clearance region, an end of the second feeder stub close to the third boundary is connected with the first radio frequency chip through the second coplanar waveguide transmission line, the second ground stub extends from a fourth boundary of the second closed clearance region to the inside of the second closed clearance region, the third boundary and the fourth boundary are two boundaries adjacent to the second closed clearance region, the second feeder stub and the second ground stub are orthogonally arranged and have no public endpoint, the second feeder stub is perpendicular to the third boundary, and the third boundary is perpendicular to the first boundary.

9. The antenna assembly according to claim 1, wherein the radio frequency chip is arranged on the first surface of the dielectric substrate.

10. The antenna assembly according to claim 1, wherein the radio frequency chip is arranged on the second surface of the dielectric substrate.

11. The antenna assembly according to claim 1, wherein a distance from a bottom of the metal resonant cavity to the antenna unit is equal to one fourth of a wavelength of an electromagnetic wave radiated by the antenna unit.

12. An interactive white board, comprising:

a display screen;

a frame arranged around the display screen; and an antenna assembly connected with the frame, wherein the antenna assembly comprises:

a dielectric substrate, wherein a first surface of the dielectric substrate comprises a ground plane and a closed clearance region located in the ground plane;

an antenna unit comprising a first antenna unit and a second antenna unit, the first antenna unit and the second antenna unit being spaced apart on the first surface of the dielectric substrate and located in the closed clearance region, and the first antenna unit and the second antenna unit being orthogonally arranged;

a radio frequency chip, arranged on the dielectric substrate and connected with the first antenna unit and the second antenna unit respectively; and a metal resonant cavity, arranged on a second surface of the dielectric substrate, wherein in a direction perpendicular to the second surface, at least a part of a projection of the closed clearance region on the metal resonant cavity is within an outer contour of the metal resonant cavity, wherein the first surface, which is not provided with the metal resonant cavity, of the dielectric substrate in the antenna assembly faces the frame.

13. The interactive white board according to claim 12, wherein the frame comprises a lower frame, the antenna assembly is detachably connected with the lower frame, the first surface, which is not provided with the metal resonant cavity, of the dielectric substrate in the antenna assembly faces a bottom surface of the lower frame, and the bottom surface is perpendicular to the display screen.

14. The interactive white board according to claim 12, wherein the frame comprises a lower frame, the antenna assembly is detachably connected with the lower frame, the first surface, which is not provided with the metal resonant cavity, of the dielectric substrate in the antenna assembly faces a side surface of the lower frame, the side surface is parallel to the display screen.

15. The interactive white board according to claim 13, wherein the material of the lower frame is metal, and a bottom surface of the lower frame is provided with an avoidance hole directly facing the antenna assembly.

16. The interactive white board according to claim 15, wherein the interactive white board further comprises a decorative piece covering the avoidance hole.

* * * * *